United States Patent
Anderson et al.

(10) Patent No.: US 7,966,268 B2
(45) Date of Patent: *Jun. 21, 2011

(54) METHOD AND APPARATUS FOR AUTOMATED IDENTIFICATION OF SIGNAL CHARACTERISTICS

(75) Inventors: Trevor Anderson, Northcote (AU); Sarah Dods, Box Hill North (AU); Adam Kowalczyk, Glen Waverly (AU); Justin Bedo, Victoria (AU); Kenneth Paul Clarke, Glen Iris (AU)

(73) Assignee: National ICT Australia Limited, Eveleigh, New South Wales (AU)

( * ) Notice: Subject to any disclaimer, the term of this patent is extended or adjusted under 35 U.S.C. 154(b) by 49 days.
This patent is subject to a terminal disclaimer.

(21) Appl. No.: 12/089,704

(22) PCT Filed: Oct. 13, 2006

(86) PCT No.: PCT/AU2006/001522
§ 371 (c)(1),
(2), (4) Date: Sep. 15, 2009

(87) PCT Pub. No.: WO2007/041807
PCT Pub. Date: Apr. 19, 2007

(65) Prior Publication Data
US 2010/0042559 A1    Feb. 18, 2010

(30) Foreign Application Priority Data

Oct. 13, 2005 (AU) ................. 2005905668
Mar. 3, 2006 (AU) ................. 2006901088
Oct. 5, 2006 (AU) ................. 2006905508

(51) Int. Cl.
*G06E 1/00* (2006.01)
*G06E 3/00* (2006.01)
*G06F 15/00* (2006.01)
*G06G 7/00* (2006.01)
*G06N 99/00* (2010.01)
*H04B 10/08* (2006.01)
*H04B 17/00* (2006.01)

(52) U.S. Cl. ............................. 706/10; 398/25
(58) Field of Classification Search ............ None
See application file for complete search history.

(56) References Cited

U.S. PATENT DOCUMENTS
5,715,372 A * 2/1998 Meyers et al. ............... 706/16
(Continued)

FOREIGN PATENT DOCUMENTS
EP    0 353 891    7/1989
(Continued)

OTHER PUBLICATIONS

Mobasseri; "Digital modulation classification using constellation shape"; 2000; Elsevier Science B.V.; Signal Processing 80; pp. 251-277.*

Zhao et al.; "NRZ-DPSK and RZ-DPSK Signals Signed Chromatic Dispersion Monitoring Using Asynchronous Delay-Tap Sampling"; Dec. 2009;; Journal of Lightwave Technology; vol. 27, No. 23; pp. 5295-5301.*

(Continued)

*Primary Examiner* — Donald Sparks
*Assistant Examiner* — Stanley K Hill

(57) ABSTRACT

A method of assessing a signal to identify particular signal characteristics comprises application of machine learning to multi-dimensional histograms derived from multi-tap sampling of the signal. The signal is sampled from at least two tap points to retrieve a sample set, and the at least two tap points are adapted to retrieve distinct samples from the signal, such as time spaced samples or spectrally distinct samples. Multiple sample sets are retrieved from the signal over time. The at least two dimensional histogram is built from the joint probability distribution of the plurality of sample sets. A machine learning algorithm then processes the multi-dimensional histogram, and is trained to predict a value of at least one characteristic of the signal.

12 Claims, 34 Drawing Sheets

U.S. PATENT DOCUMENTS

| | | | |
|---|---|---|---|
| 6,466,614 | B1 | 10/2002 | Smith |
| 7,283,744 | B2 * | 10/2007 | Dinu et al. .................. 398/33 |
| 7,742,806 | B2 * | 6/2010 | Sternickel et al. ............ 600/509 |
| 2002/0055334 | A1 | 5/2002 | Simmons |
| 2002/0171885 | A1 * | 11/2002 | Rasztovits-Wiech et al. ............... 359/110 |

FOREIGN PATENT DOCUMENTS

| | | |
|---|---|---|
| WO | WO 94/06233 | 3/1994 |
| WO | WO 00/69137 | 11/2000 |
| WO | WO 01/52469 | 7/2001 |

OTHER PUBLICATIONS

Skoog et al.; "Automatic Identification of Impairments Using Support Vector Machine Pattern Classification on Eye Diagrams"; Nov. 2006;; IEEE Photonics Technology Letters; vol. 18, No. 22; pp. 2398-2400.*

Wong et al.; "Automatic digital modulation recognition using artificial neural network and genetic algorithm"; 2004; Elsevier B.V; Signal Processing 84; pp. 351-365.*

* cited by examiner

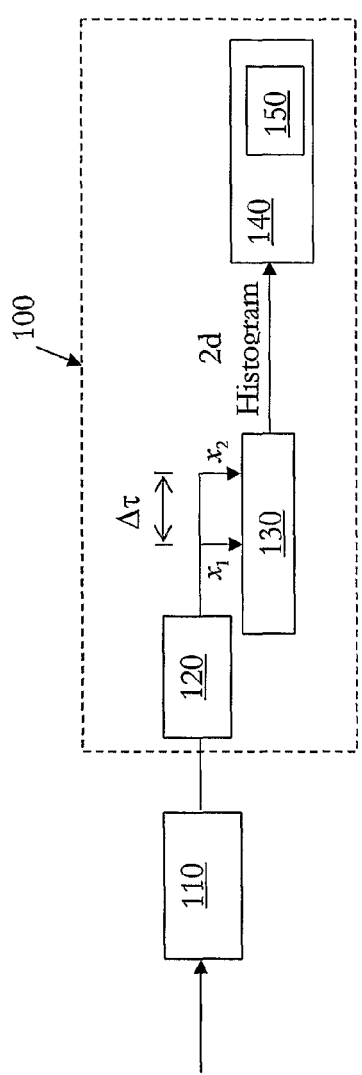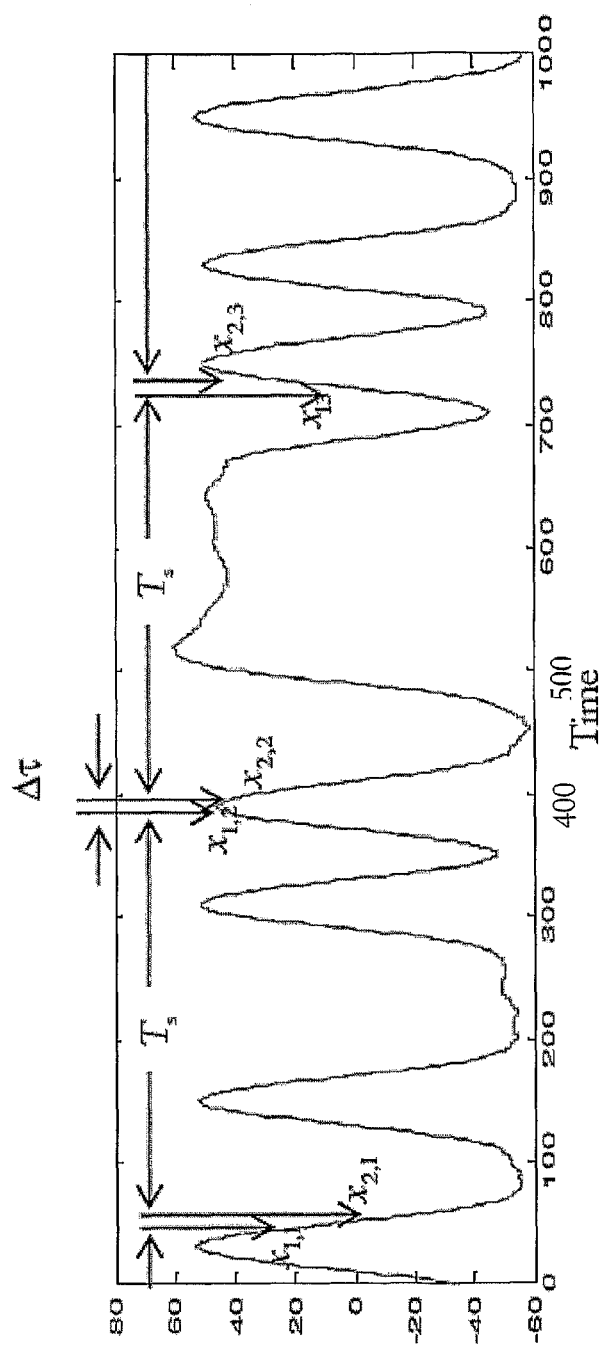
Figure 1
Figure 2

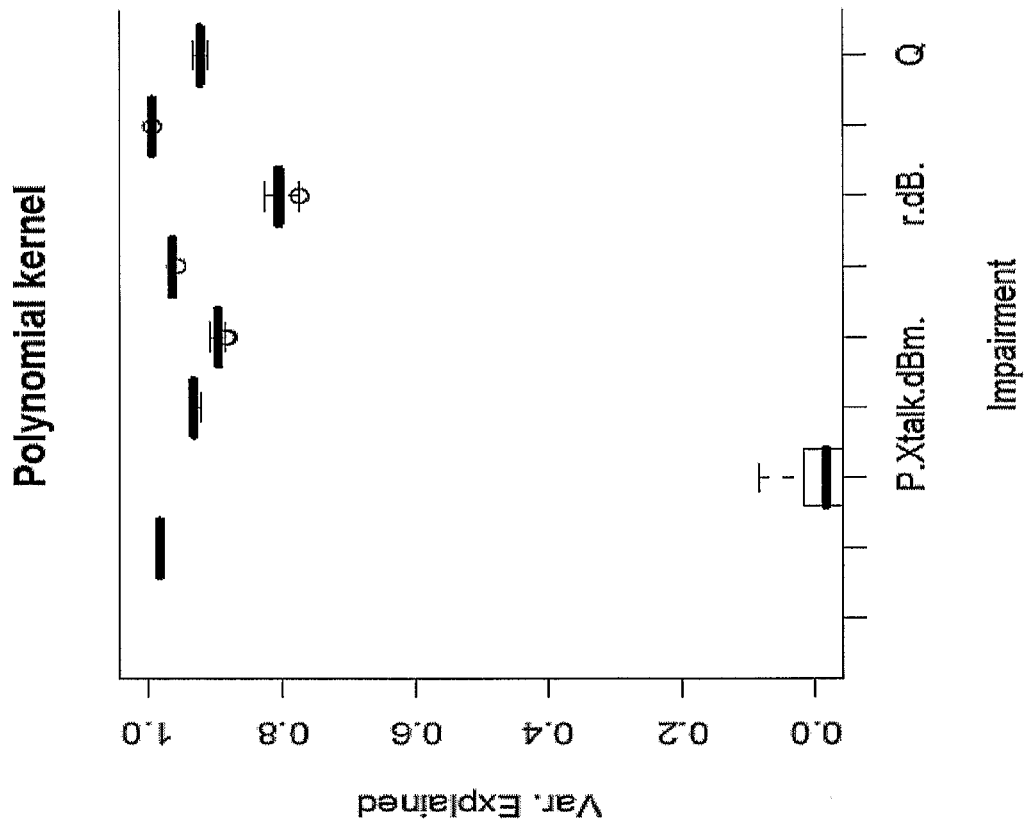
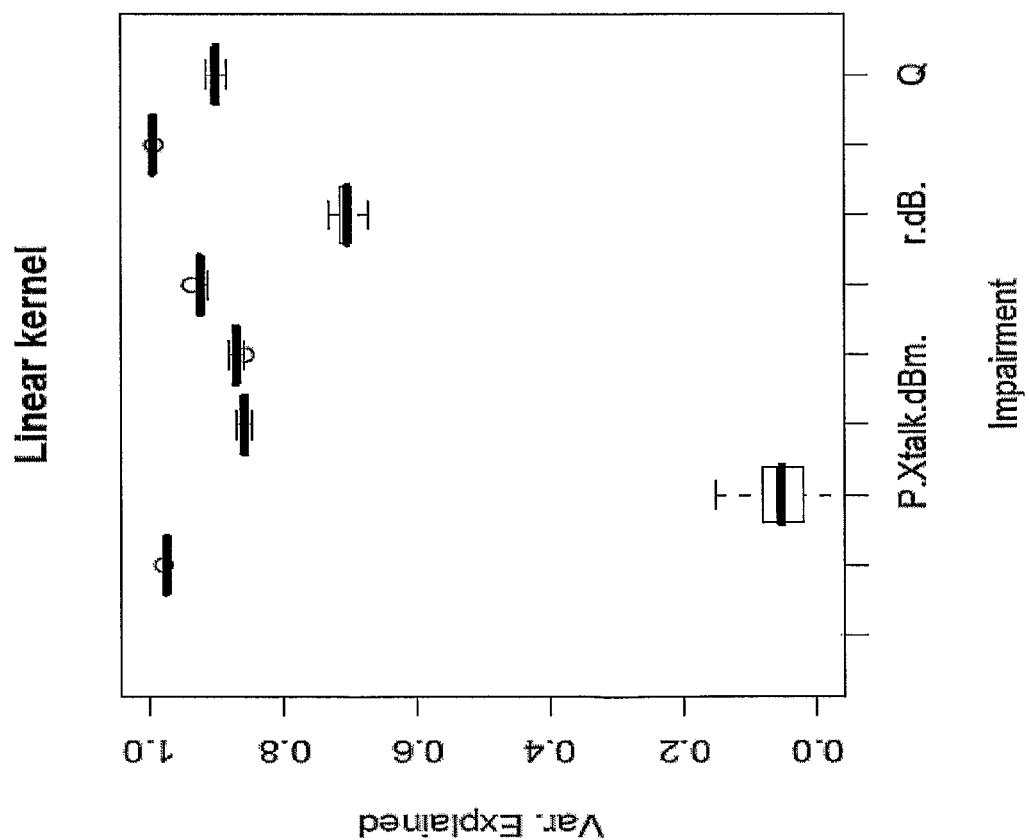
Figure 20B
Figure 20A

Standard eyes top and phase portraits for (a) NRZ, (b) NRZ DPSK. Inset shows 70 GHz optical bandwidth results for RZ and NRZ with no chromatic dispersion for comparison

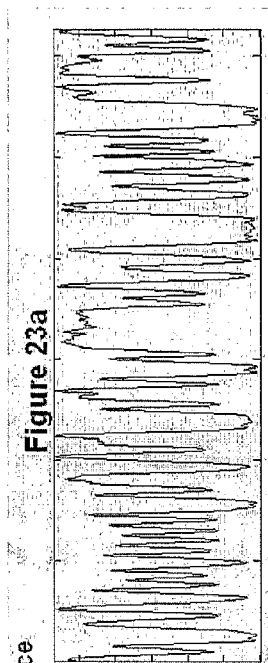
Figure 23a
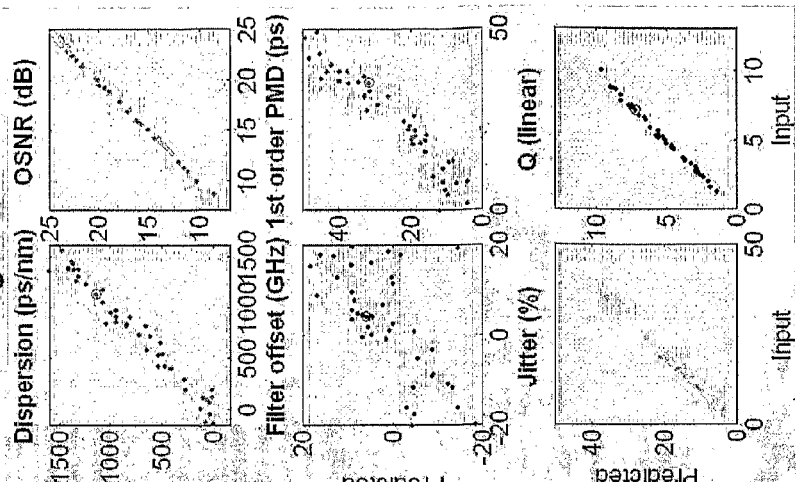
Figure 23d
Figure 23c
Figure 23b
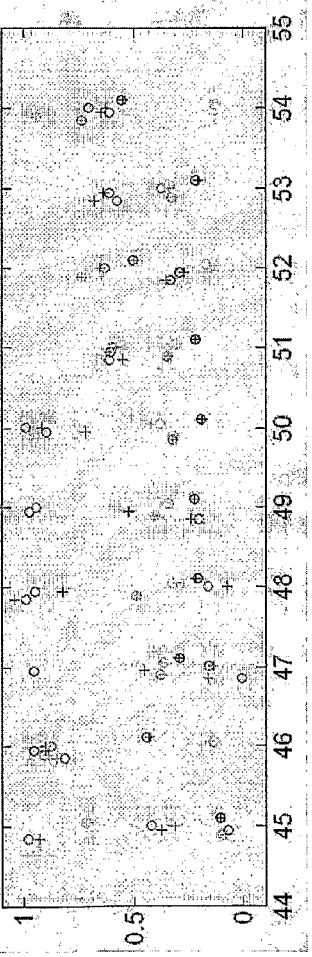
Figure 23e

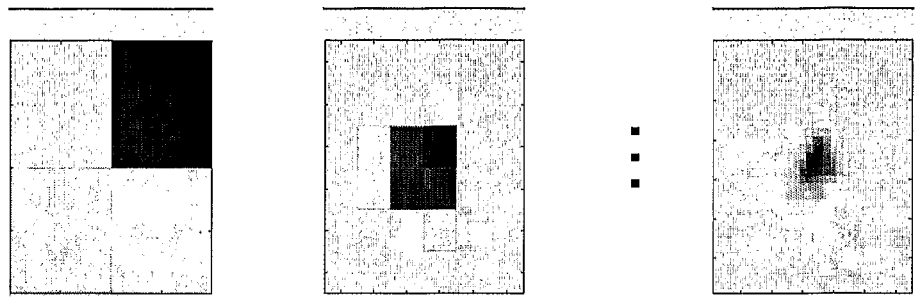
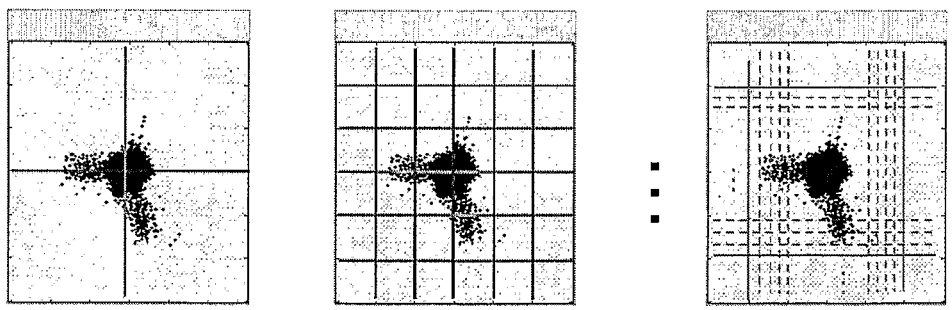
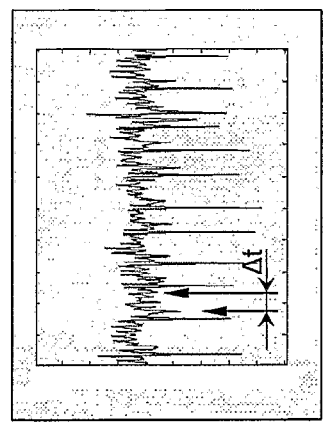
Figure 27a
Figure 27b
Figure 27c

METHOD AND APPARATUS FOR AUTOMATED IDENTIFICATION OF SIGNAL CHARACTERISTICS

CROSS-REFERENCE TO RELATED APPLICATIONS

The present application claims priority from Australian Provisional Patent Application No 2005905668 filed on 13 Oct. 2005, Australian Provisional Patent Application No 2006901088 filed on 3 Mar. 2006, and Australian Provisional Patent Application No. 2006905508 filed on 5 Oct. 2006, the contents of which are incorporated herein by reference.

TECHNICAL FIELD

The present invention relates to identification of signal characteristics, and in particular relates to the application of machine learning algorithms to phase portraits of signals in order to identify one or more characteristics of the signal.

BACKGROUND OF THE INVENTION

There exist a wide range of applications in which it is desirable to determine characteristics of a signal in a substantially automated manner. One such application is data transmission media in general, and for example optical performance monitoring in particular, where it is desirable to identify changes in transmitted optical signals in order to diagnose the cause and location of underlying faults, to optimize the performance of tuneable elements, and to estimate the bit-error rate (BER). Other such applications include sensed biological signals in general, and for example electrocardiogram signal monitoring in particular, where it may be desirable to identify signal characteristics such as the occurrence of, impending onset of, or impending cessation of arrhythmia, fibrillation or other such signal characteristics.

Attempts have been made, with varying levels of success, to identify characteristics of signals based on frequency domain analysis and time domain analysis of the signal in question. Frequency domain methods analyse the spectral content of the signal, and generally average the signal over time and therefore contain little or no information about signal distortion. Time domain signal monitoring techniques sample or obtain a trace of the signal, to produce a representation of the signal waveform. Such time domain techniques are sensitive to signal distortion and noise.

Significant effort has been put into correlating observed signal changes, whether in the frequency domain or time domain, with various signal characteristics. Such signal characteristics could be the result of signal degradation mechanisms arising between the signal source and the point of observation, or could be the result of changes in the signal source itself. However, differentiating between signal characteristics can be difficult, particularly when several characteristics occur simultaneously, as a change in one signal characteristic may cause changes which are to date indiscernible in the observed signal, particularly where the signal is highly complex such as a signal sensed from a biological system. Similarly, changes in different signal characteristics can cause highly similar changes in the signal in question, such that while it may be deduced that some change in the signal has occurred, it may be difficult to determine which signal characteristic out of a plurality of possible characteristics caused the change.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY OF THE INVENTION

According to a first aspect the present invention provides a method of assessing a signal, the method comprising:
sampling the signal from at least two tap points to retrieve a sample set, the at least two tap points adapted to retrieve distinct samples from the signal;
retrieving a plurality of such sample sets over time;
building an at least two dimensional histogram of the joint probability distribution of the plurality of sample sets; and
passing the at least two dimensional histogram to a machine learning algorithm trained to predict a value of at least one characteristic of the signal.

According to a second aspect the present invention provides a device for assessing a signal, the device comprising:
a multi-tap sampler for sampling from the signal a sample set from at least two tap points adapted to retrieve distinct samples from the signal, and for retrieving a plurality of such sample sets over time; and
a processor for building an at least two dimensional histogram of the joint probability distribution of the plurality of sample sets; and
a machine learning module for processing the at least two dimensional histogram and trained to predict a value of at least one characteristic of the signal.

The present invention recognises that an effective assessment of a signal may be obtained by applying a trained machine learning algorithm to a joint probability distribution produced from obtaining many sample sets from the signal. For example, when each sample set comprises two samples $x_1$ and $x_2$ obtained from two tap points separated by a tap delay time, a two dimensional plot of the probability density function of $x_1$ vs. $x_2$ takes a form which depends upon both the tap delay between the two sampling points, and upon characteristics of the signal. Thus, a change in one or more characteristics of the signal leads to changes in the probability density function which can in turn be identified, measured, and/or predicted by machine learning processing.

The machine learning module may rely on supervised learning techniques for either classification or regression, such as k-nearest neighbours, decision trees, regression, ridge regression, neural networks and/or support vector machine/regression. The machine learning module may utilise a linear kernel, or a non-linear kernel, such as a polynomial of degree n.

The machine learning module may be trained on training sets created from simulations and/or experimental measurements. Each element of the training set preferably comprises an at least two dimensional histogram representing sample density of a joint probability distribution or phase portrait.

Preferably, the machine learning assessment of the distribution of the sample set comprises assessing sample density throughout the scatter plot, for example by considering the scatter plot area as a plurality of sub-areas and determining a number of sample points occurring in each sub-area so as to generate a two dimensional histogram of sample density. The sub-areas are preferably evenly sized elements of a grid, such as a square grid. Or, the sub-areas may be of differing sizes, for example a maximum bin size may capture all points above a maximum threshold, while a minimum bin size may capture all points below a minimum threshold. The grid element size may be selected or refined to improve prediction accuracy. The grid element size may be increased in order to decrease processing requirements. For example a single decision threshold (1 bit resolution) could be used on each tap. Such embodiments recognise that it is advantageous to include sample density as a factor in the machine learning assessment.

The at least two tap points are preferably adapted to retrieve samples from the signal which are distinct by virtue of being obtained from portions of the signal which are separated in time, such time separation being referred to as the tap delay. The or each tap delay is preferably tuneable. Such embodiments enable tuning of the or each tap delay in order to assess a selected signal characteristic. For example, the or each tap delay may be tuned or set to be substantially equal to a period of a periodic component of interest in the signal, or to an integer fraction of such a period. Additionally or alternatively the tap delay may be continuously tuned to provide a histogram time series (or time series of histograms).

The sample sets are preferably retrieved from the signal at a regular sampling interval. Alternatively, the sample sets may be retrieved at irregular or random intervals.

In embodiments assessing high frequency periodic signals, the sampling interval may be substantially greater than the signal period, for example many orders of magnitude greater than the signal period, in order to reduce processing speed demands upon sampled data retrieval devices, and thus reduce the cost required for such data retrieval devices. Alternatively the sampling interval may be of the order of the signal period or substantially less than the signal period, particularly in embodiments for assessing a low frequency periodic signal such as a sensed biological signal.

In embodiments consisting of two sample taps which retrieve a sample set consisting of $x_1$ and $x_2$, the probability density function may be obtained by plotting $x_1$ vs. $x_2$, or by plotting $(x_1-x_2)$ vs. $(x_1+x_2)$, or by use of other two dimensional representations.

In further embodiments of the invention, three or more sample tap points separated by tap delays may be provided in order to retrieve sample sets consisting of three or more samples. For example, where the tap delay separation of three such tap points is a fraction of a period of the signal, a probability density function of such sample sets may be used to obtain information about signal curvature.

In some embodiments, a band or channel of interest of the signal may be selected by use of a band pass filter prior to sampling.

In some embodiments, the at least two tap points may be adapted to retrieve samples from distinct spectral positions of the signal. For example the signal may be split into two components, with a first component being passed through a first filter having a first passband, and a second component being passed through a second filter having a second passband distinct from the first passband. For example, the first passband may be substantially centred upon a first frequency of interest of the signal, while the second passband may be substantially centred upon a second frequency of interest of the signal.

Additionally or alternatively, in further embodiments of the invention the at least two tap points may be adapted to retrieve samples from distinct polarisation components of the signal. For example the signal may be split into two components, with a first component being passed through a first polariser having a first polarisation alignment, and a second component being passed through a second polariser having a second polarisation alignment distinct from the first polarisation alignment.

In some embodiments the present invention may be applied for the purposes of optical signal impairment monitoring in conjunction with the techniques and disclosure of the International Patent Cooperation Treaty (PCT) Application filed simultaneously with the present application by the present applicants and claiming priority from Australian Provisional Patent Application No 2005905668 filed on 13 Oct. 2005, Australian Provisional Patent Application No 2006901088 filed on 3 Mar. 2006, and Australian Provisional Patent Application No. 2006905508 filed on 5 Oct. 2006. The contents of that simultaneously filed PCT Application are incorporated herein by reference.

BRIEF DESCRIPTION

Examples of the invention will now be described with reference to the accompanying drawings, in which:

FIG. 1 is a schematic of a two tap signal sampling device in accordance with an embodiment of the present invention;

FIG. 2 illustrates sampling of a signal by the device of FIG. 1 with tap delay $\Delta\tau$ and sampling interval $T_s$;

Figure 7:
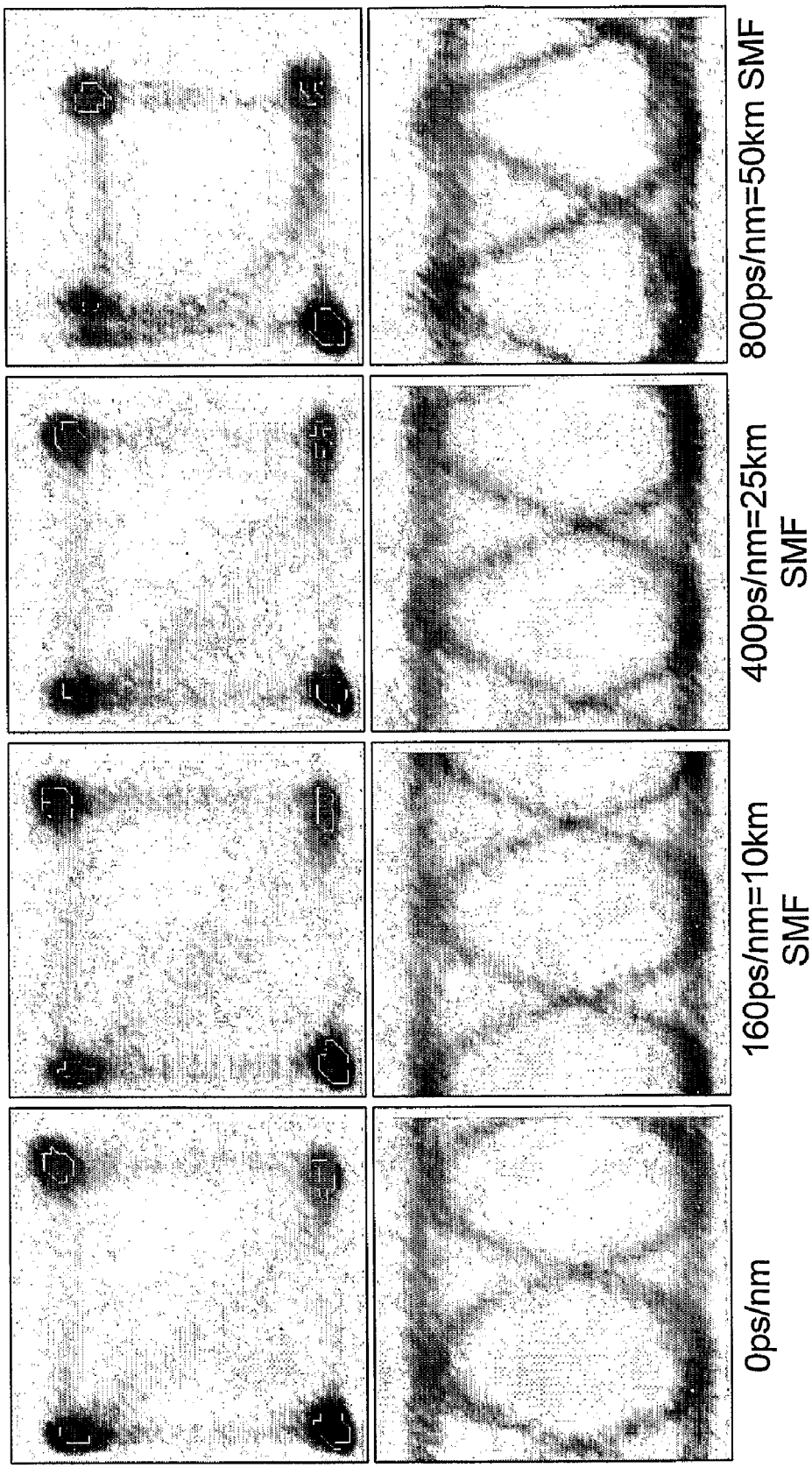
Figure 8:
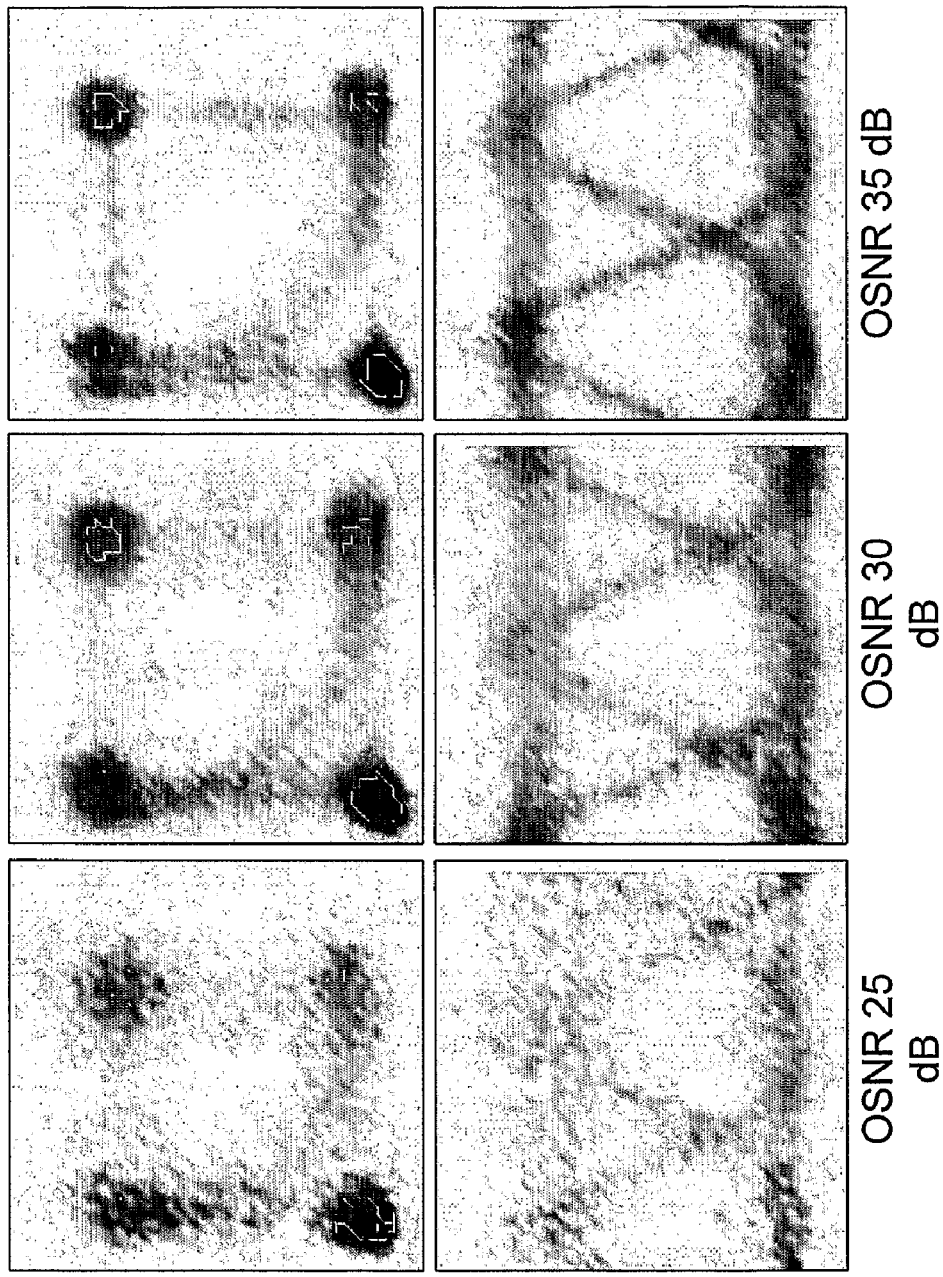
Figure 9:
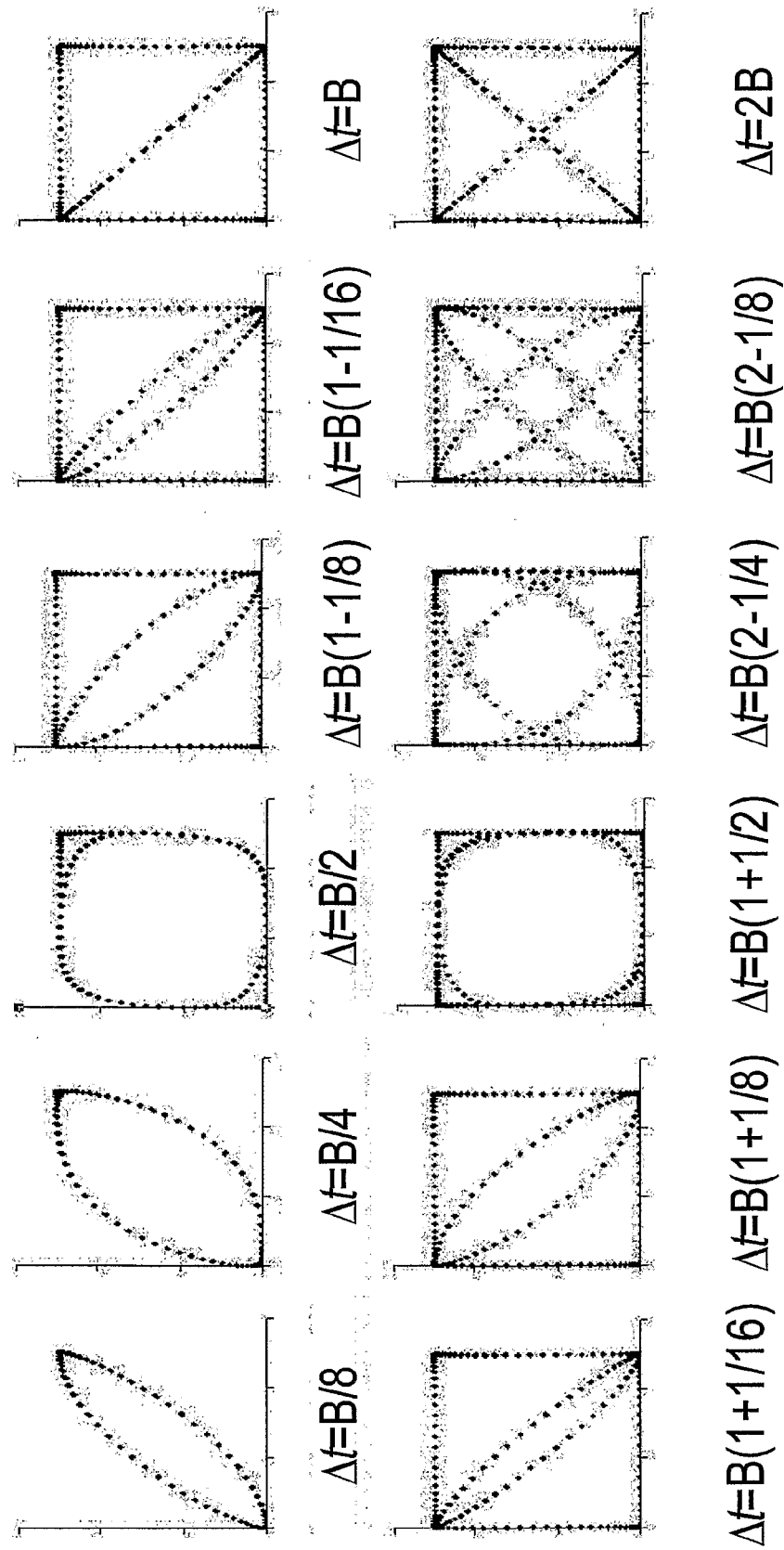
Figure 10:
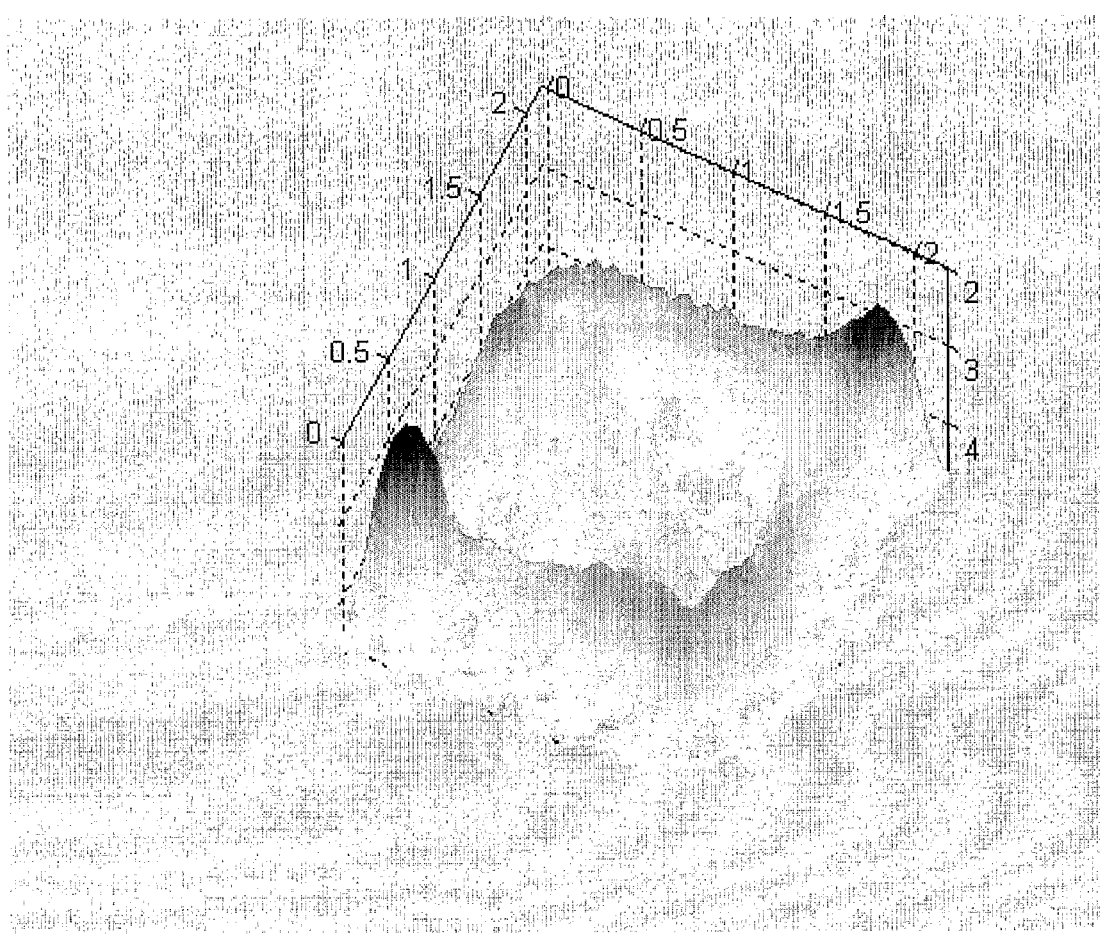
Figure 11:
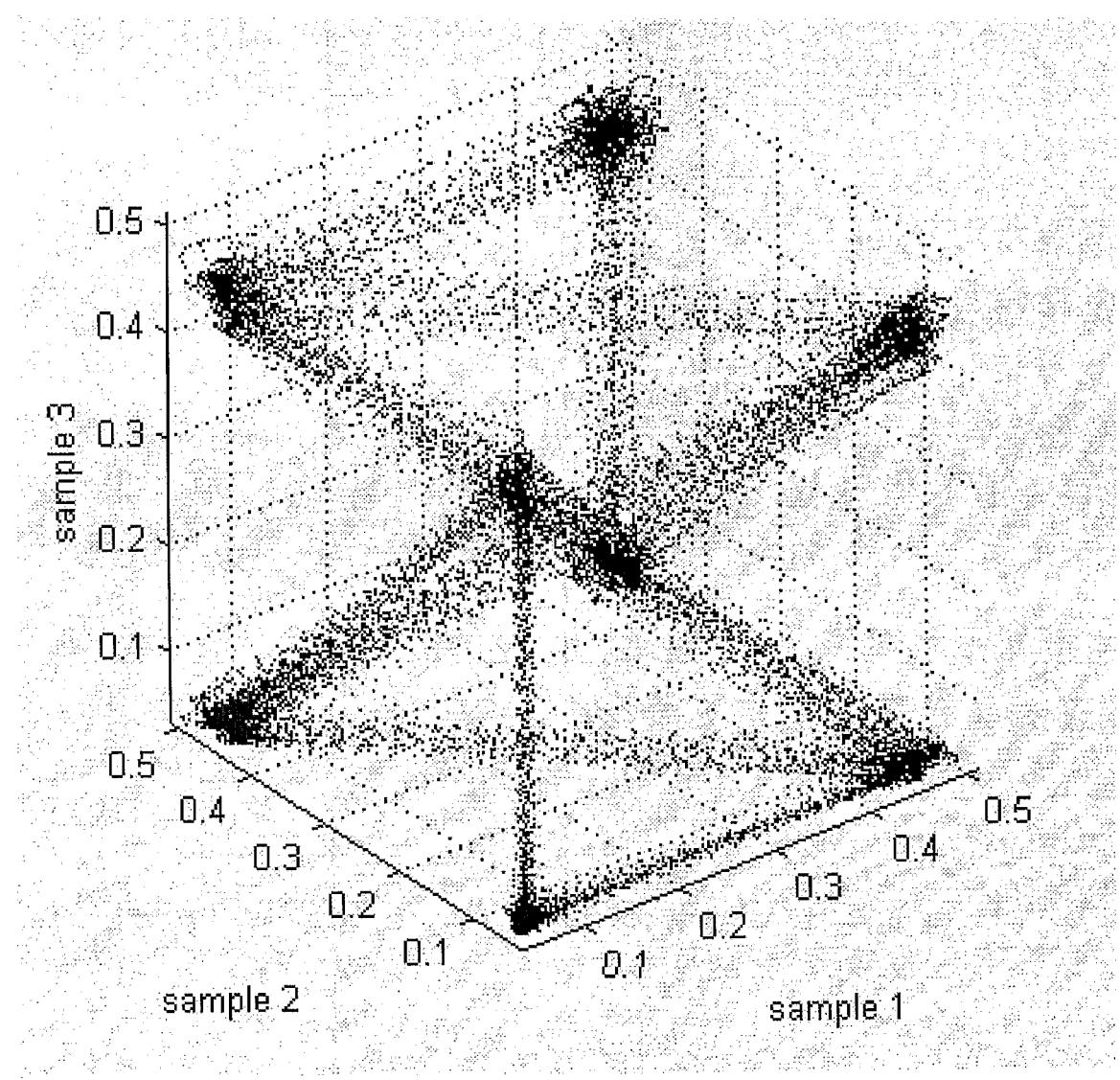
Figure 12:
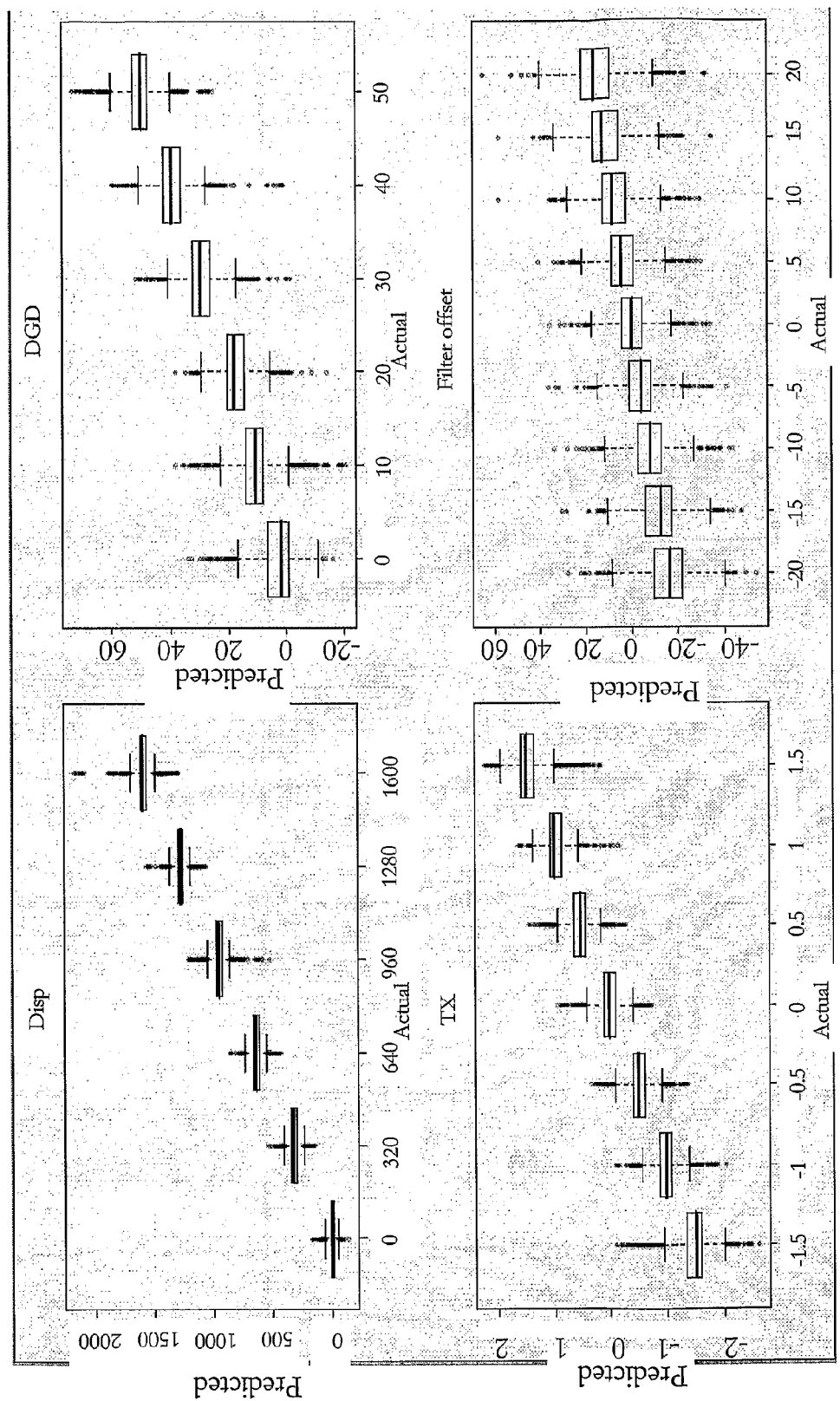
Figure 13:
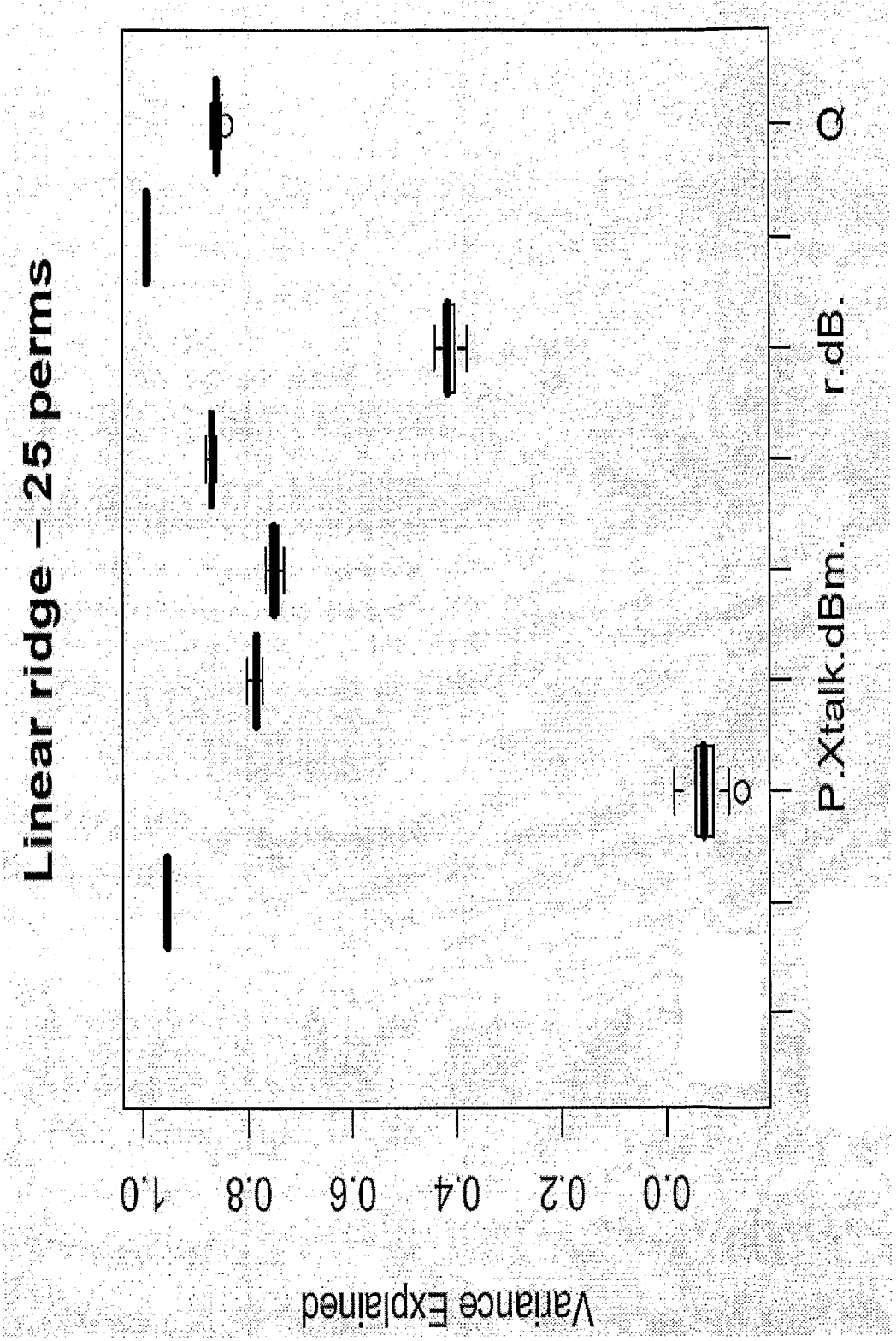
Figure 14:
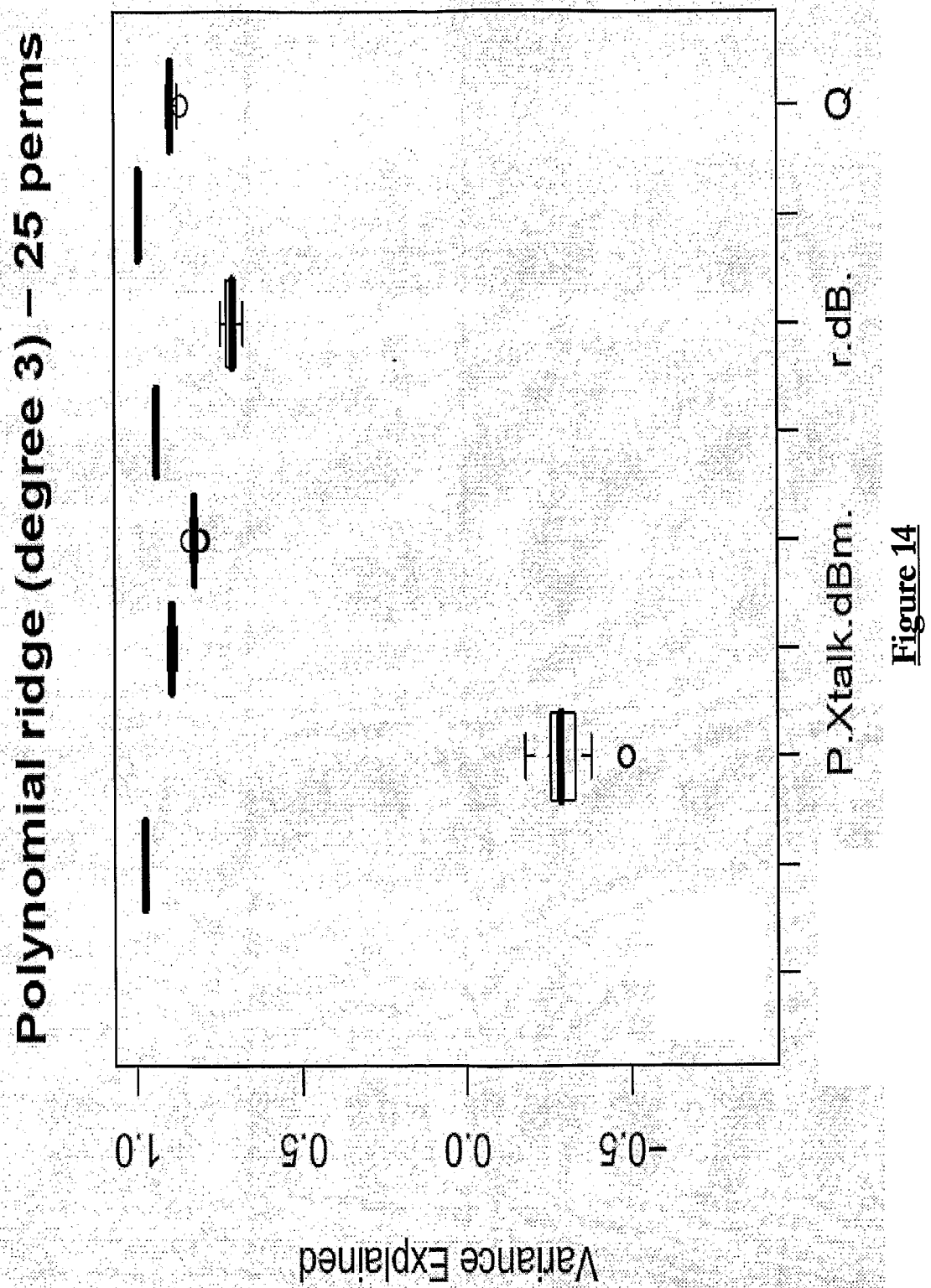
Figure 15:
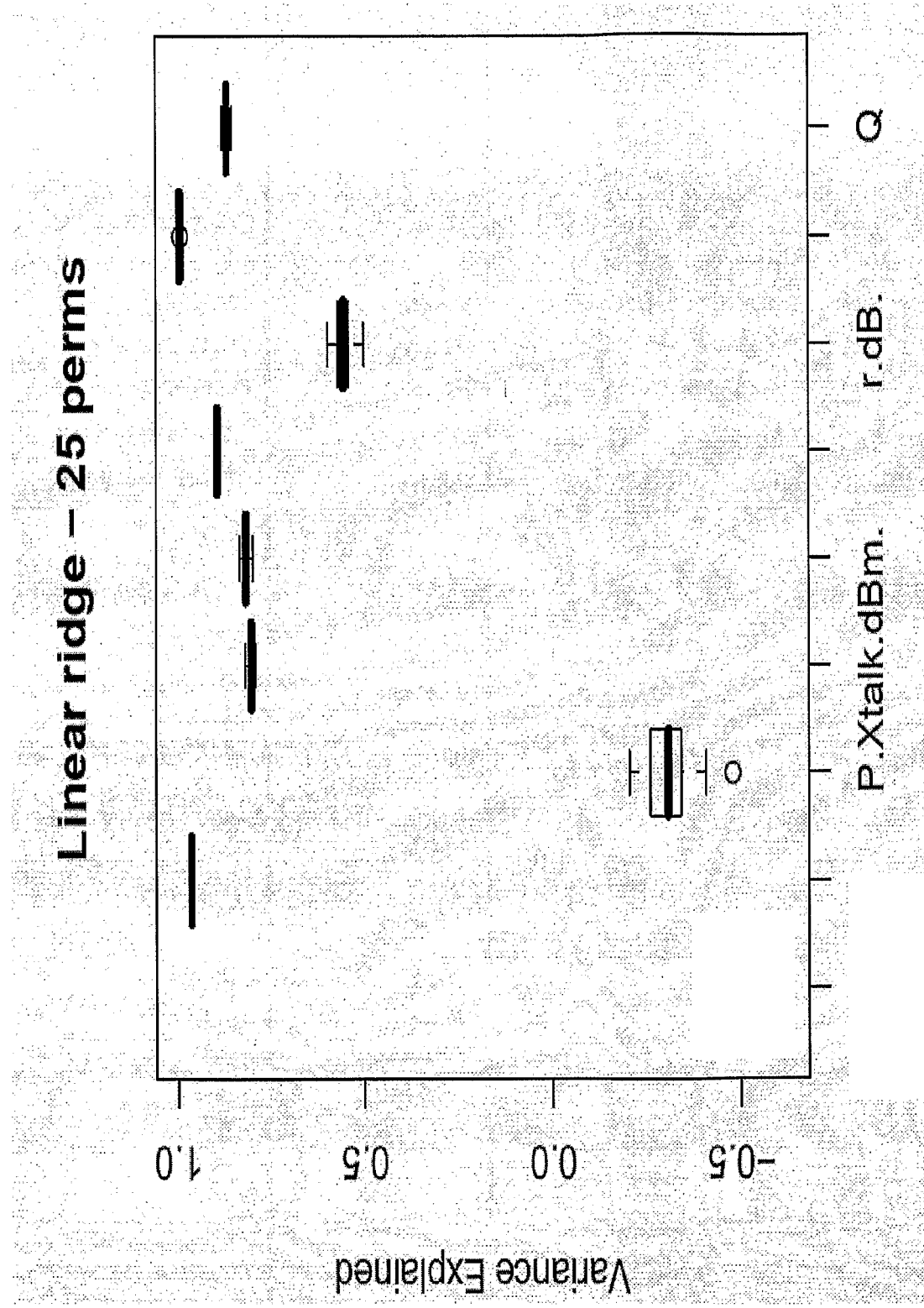
Figure 16:
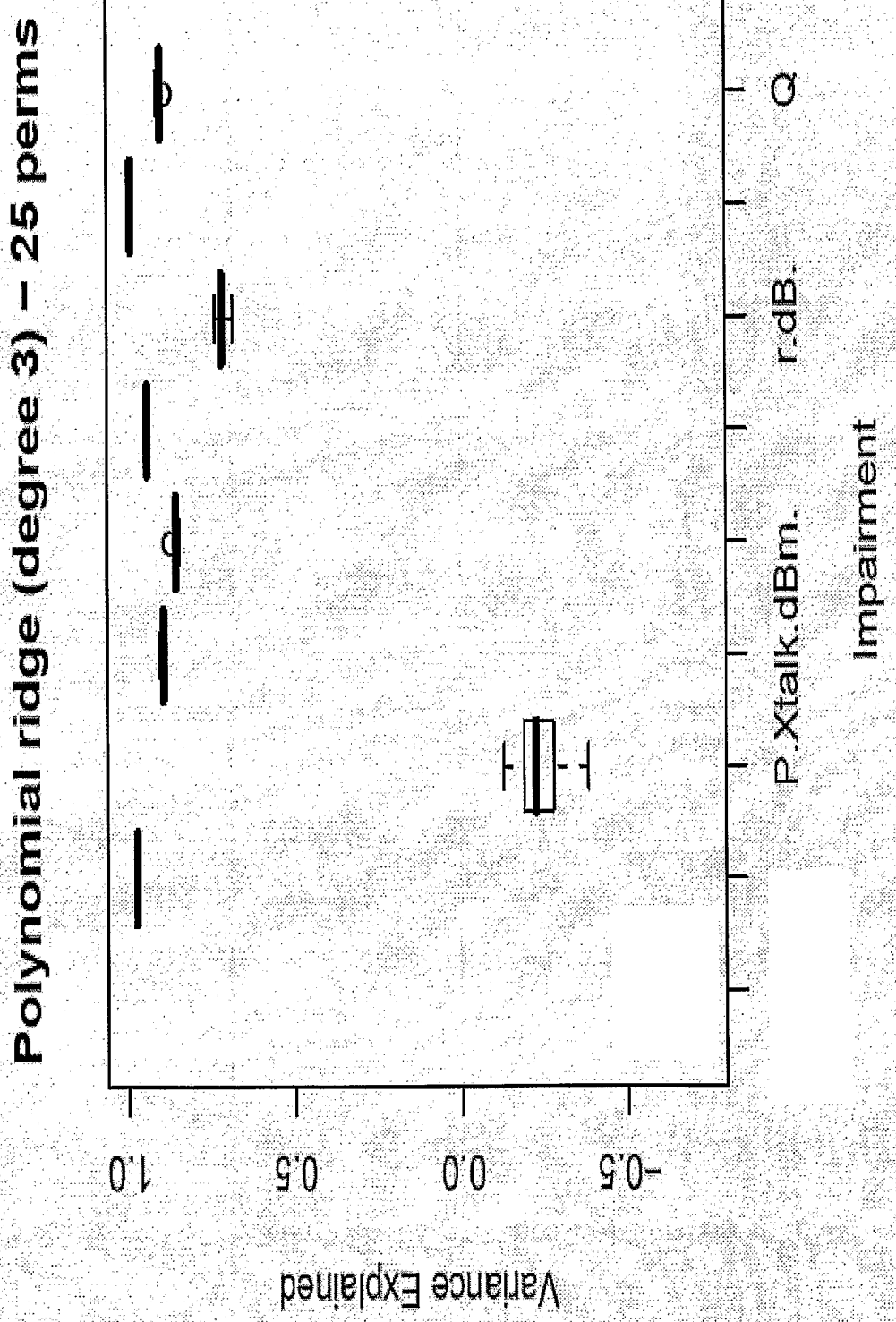
Figure 17:
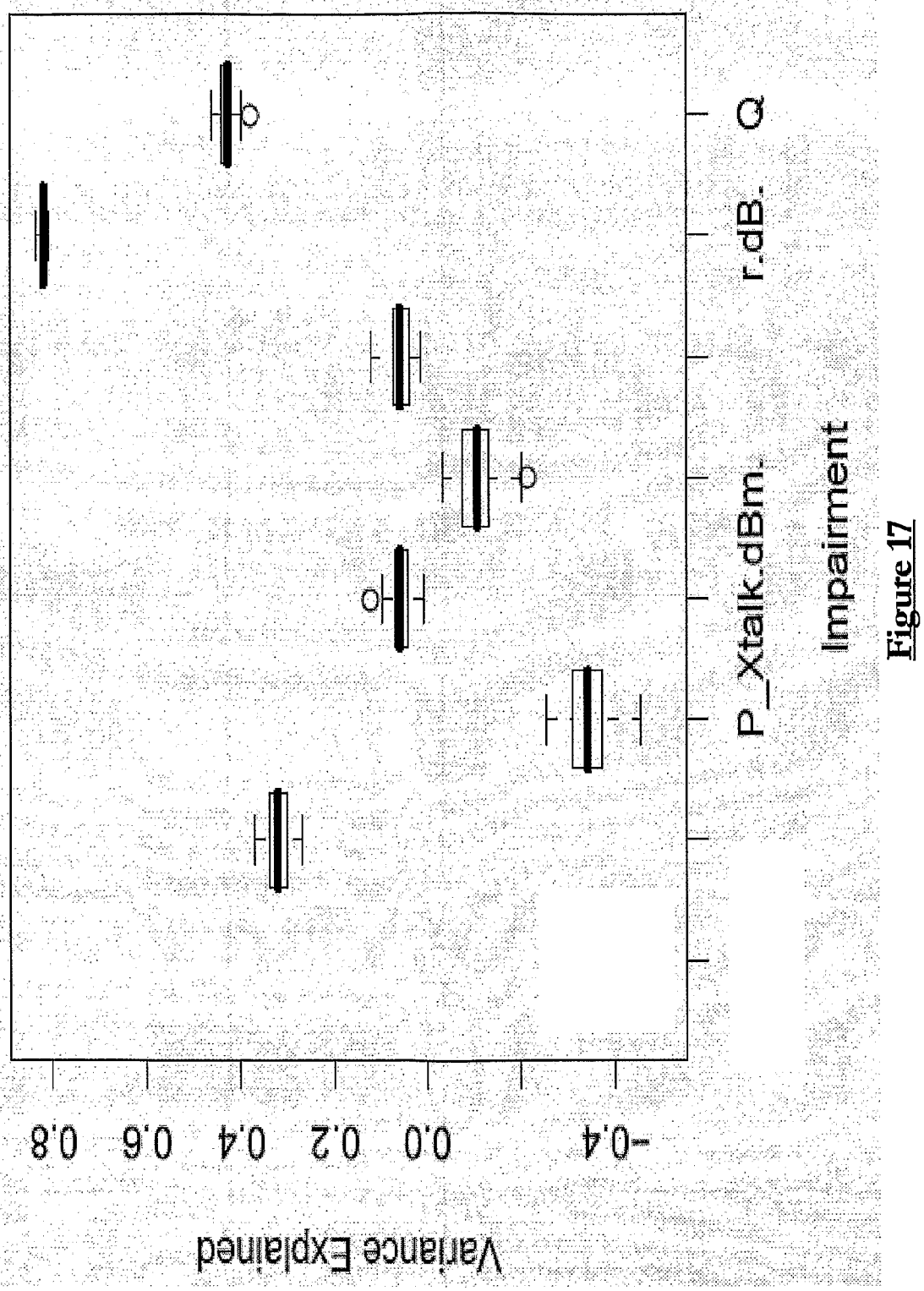
Figure 18:
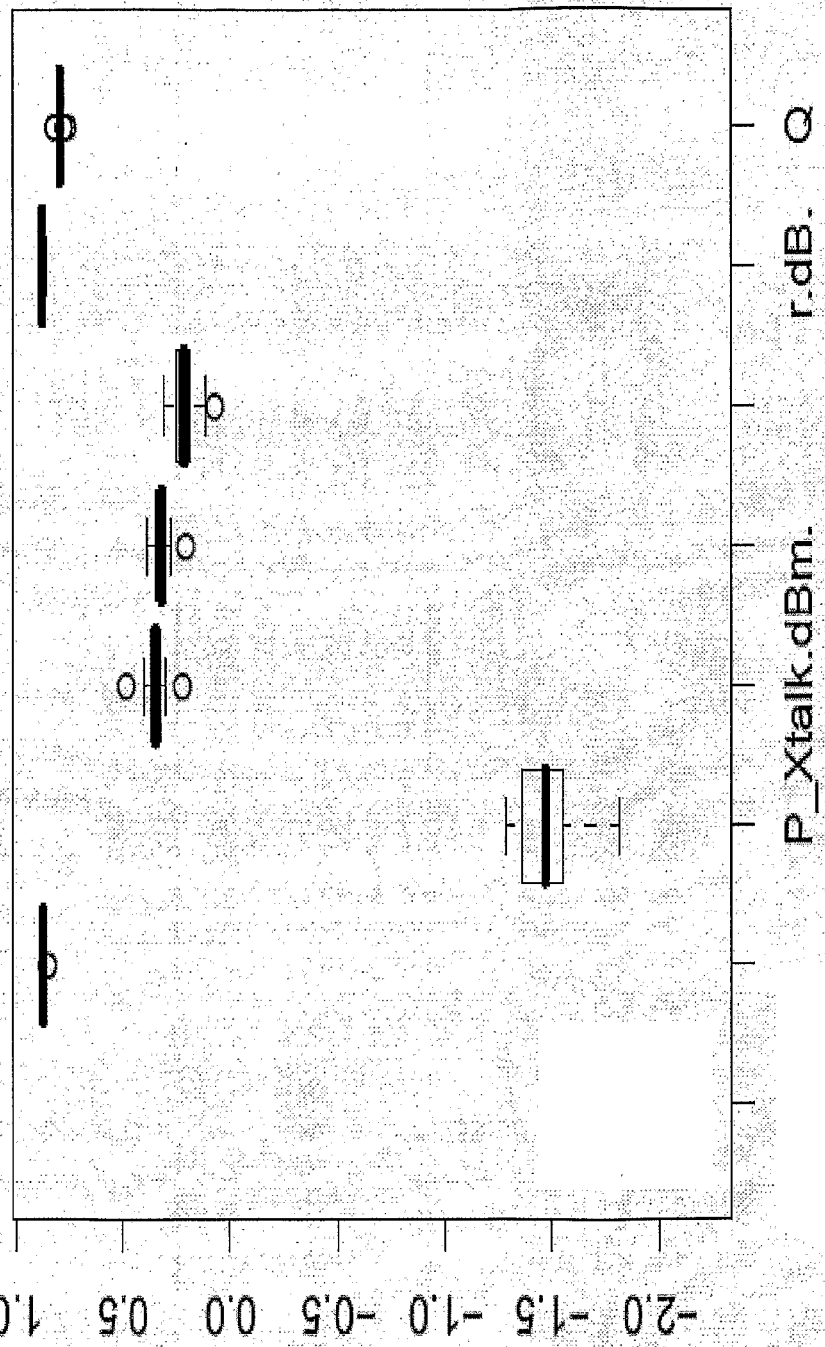
Figure 19B:
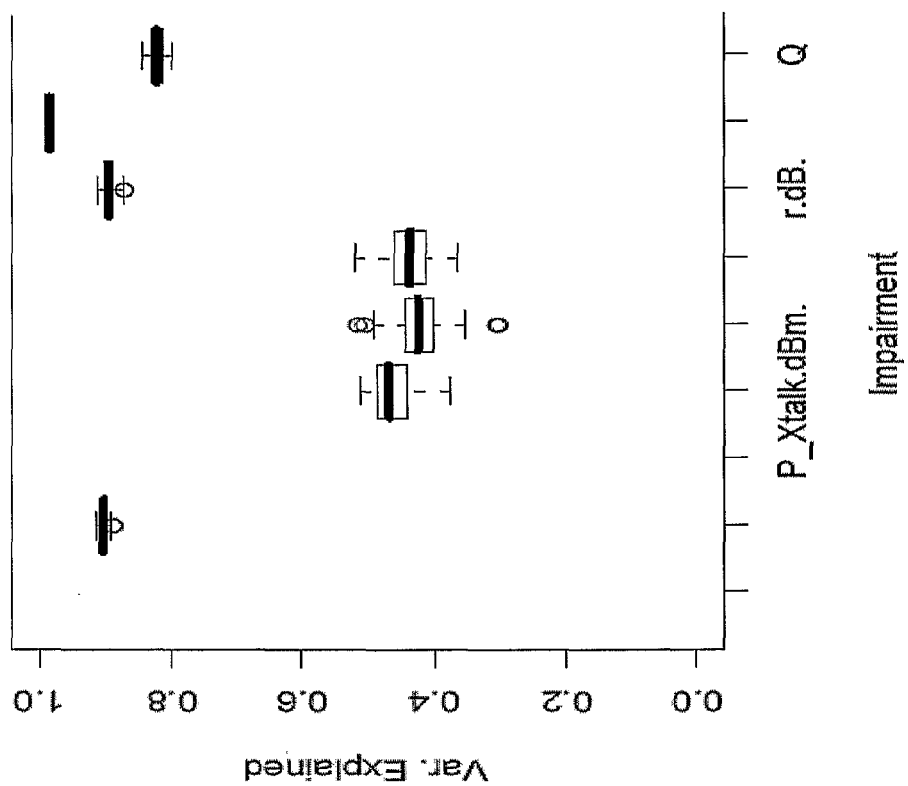
Figure 19A:
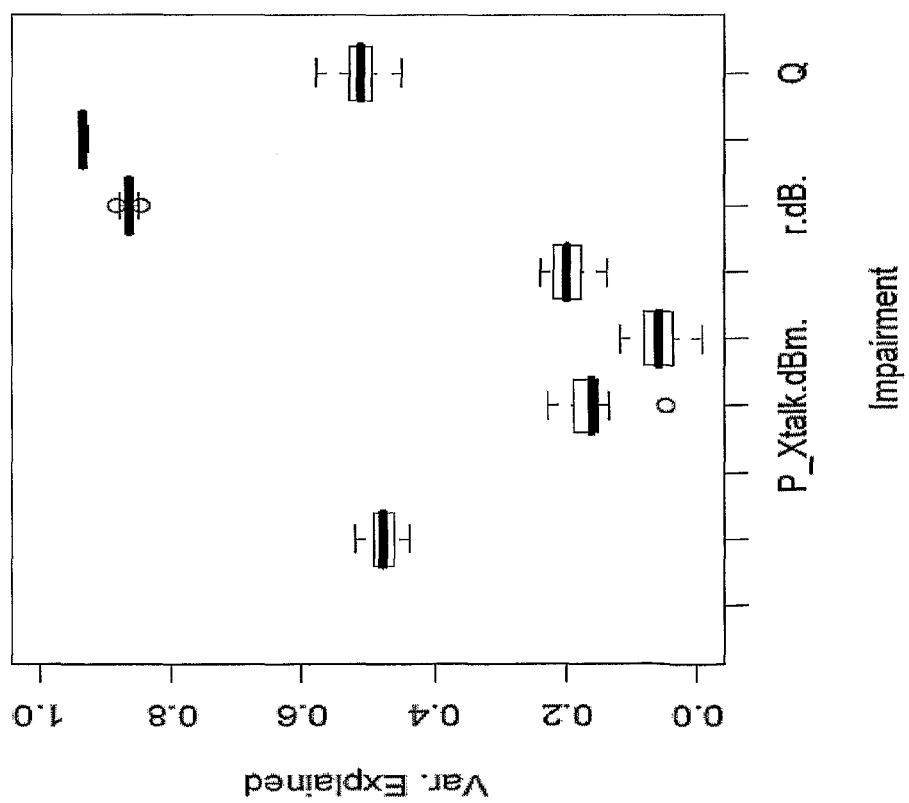
Figure 21B:
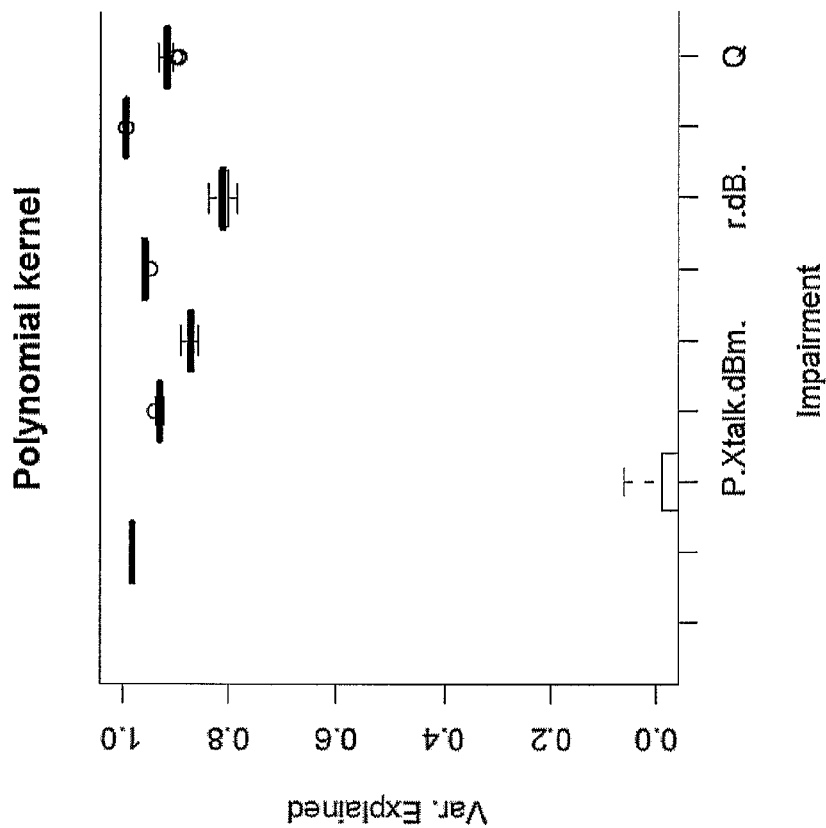
Figure 21A:
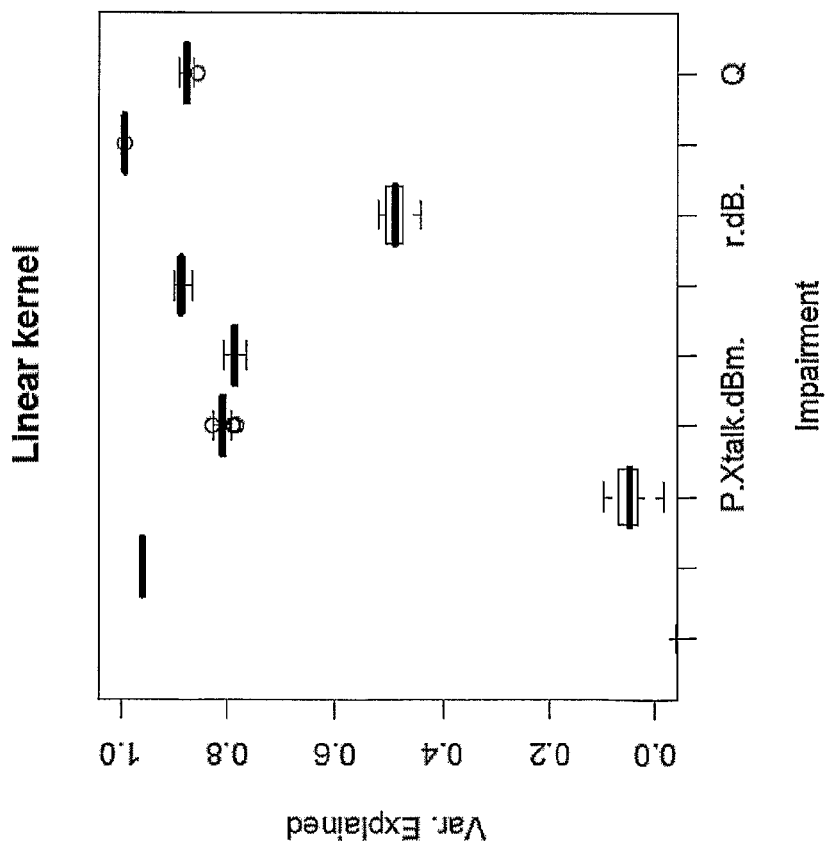
Figure 22:
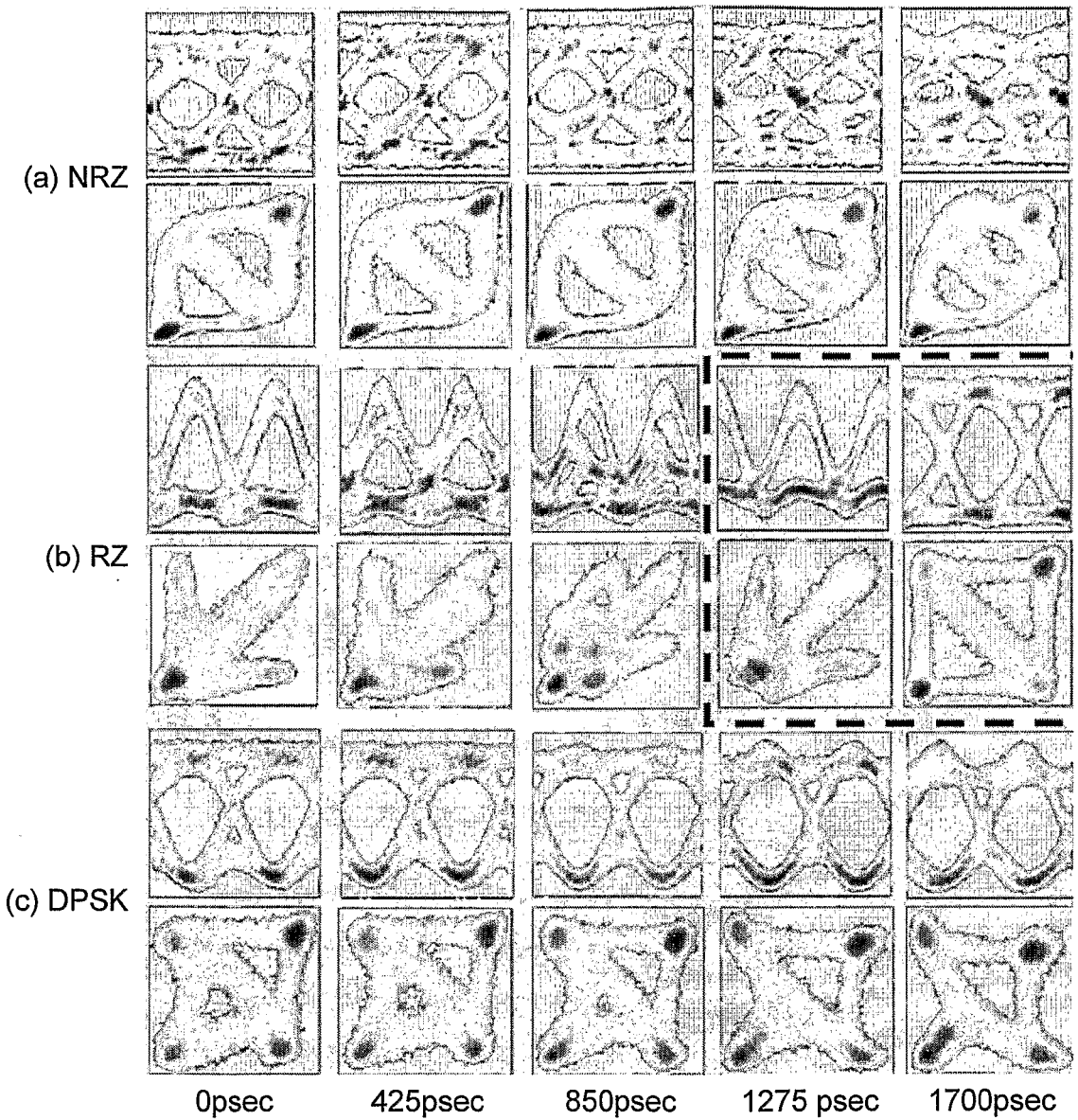
Figure 25:
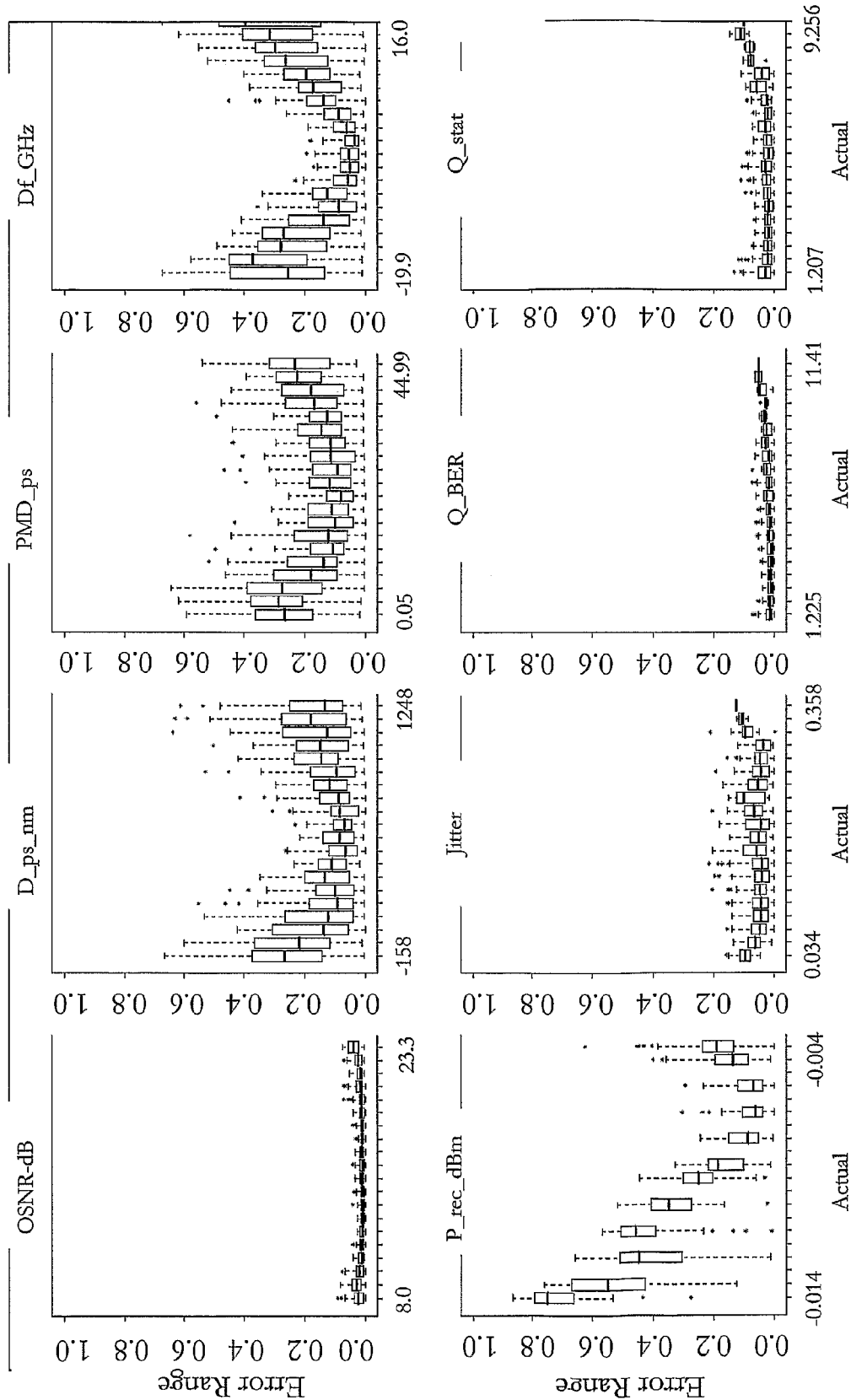
Figure 26:
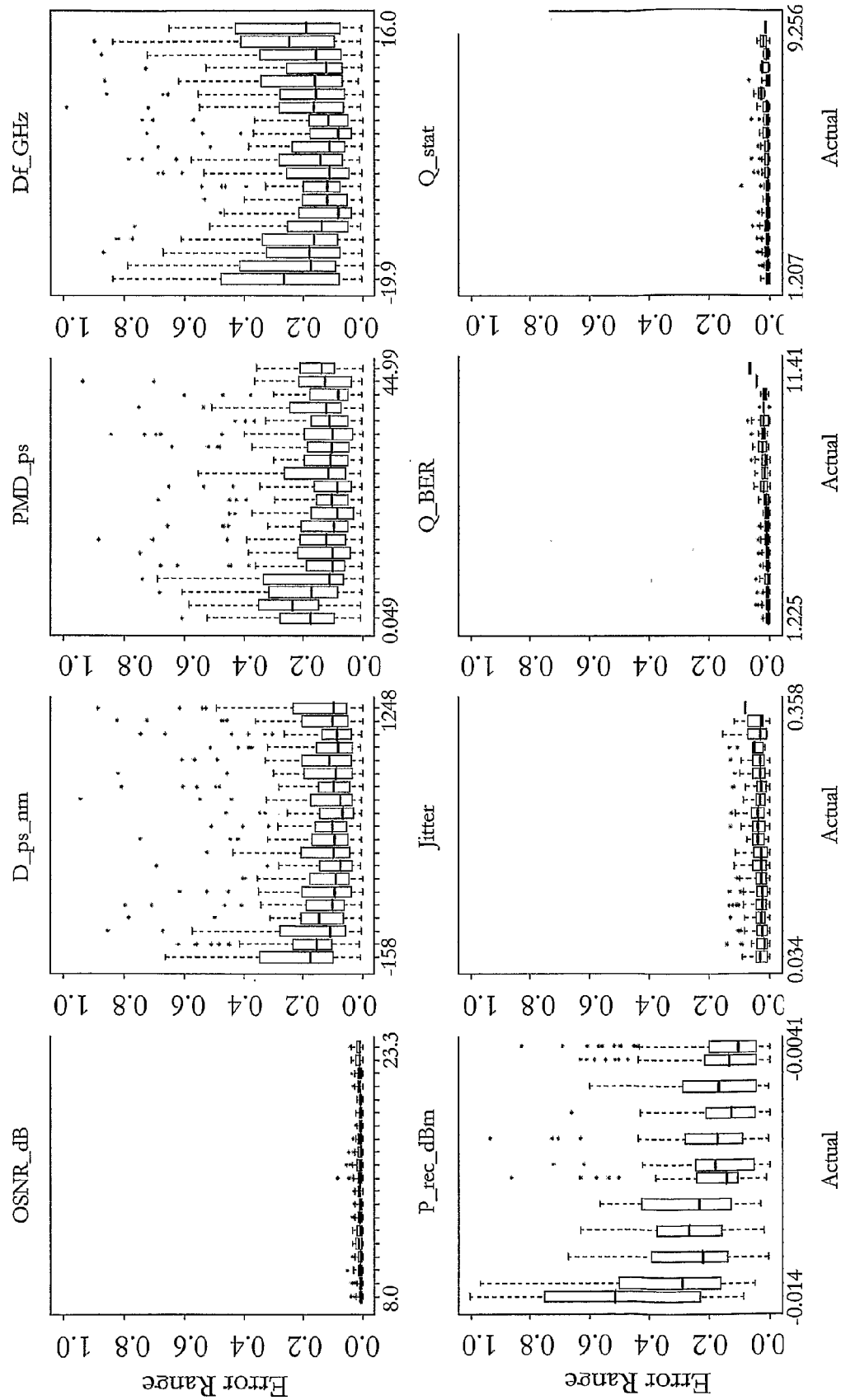
Figure 28:
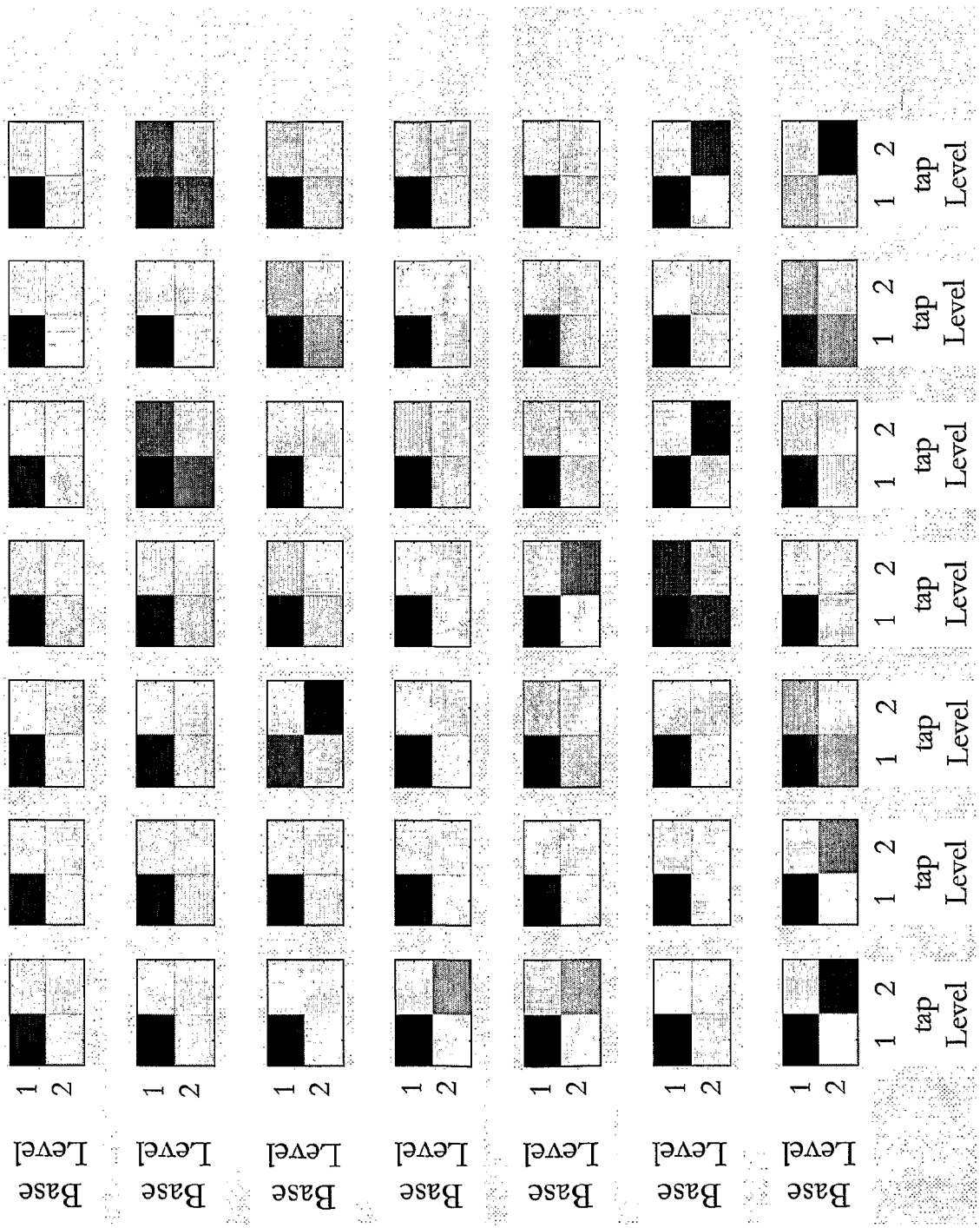
Figure 29:
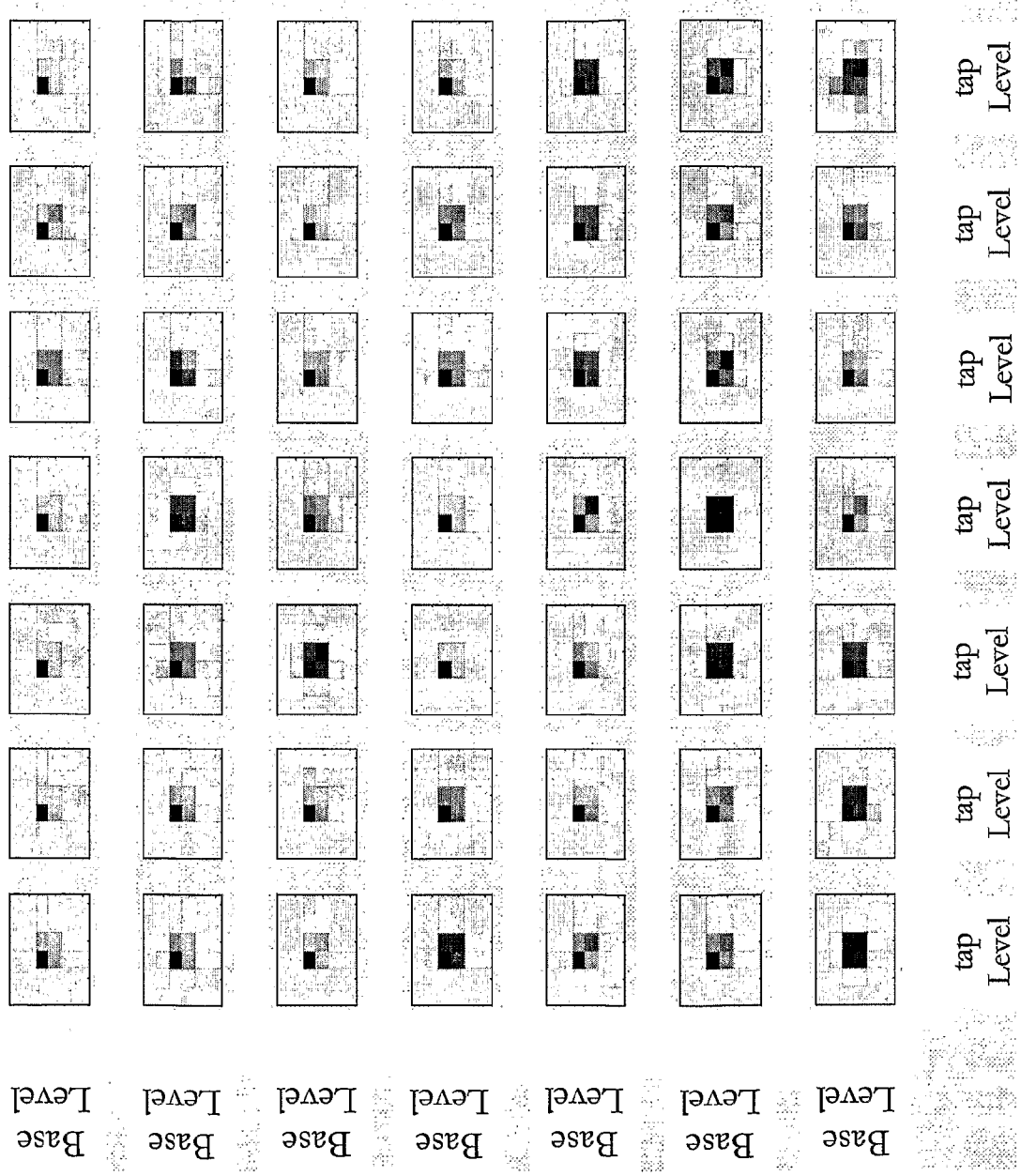
Figure 30:
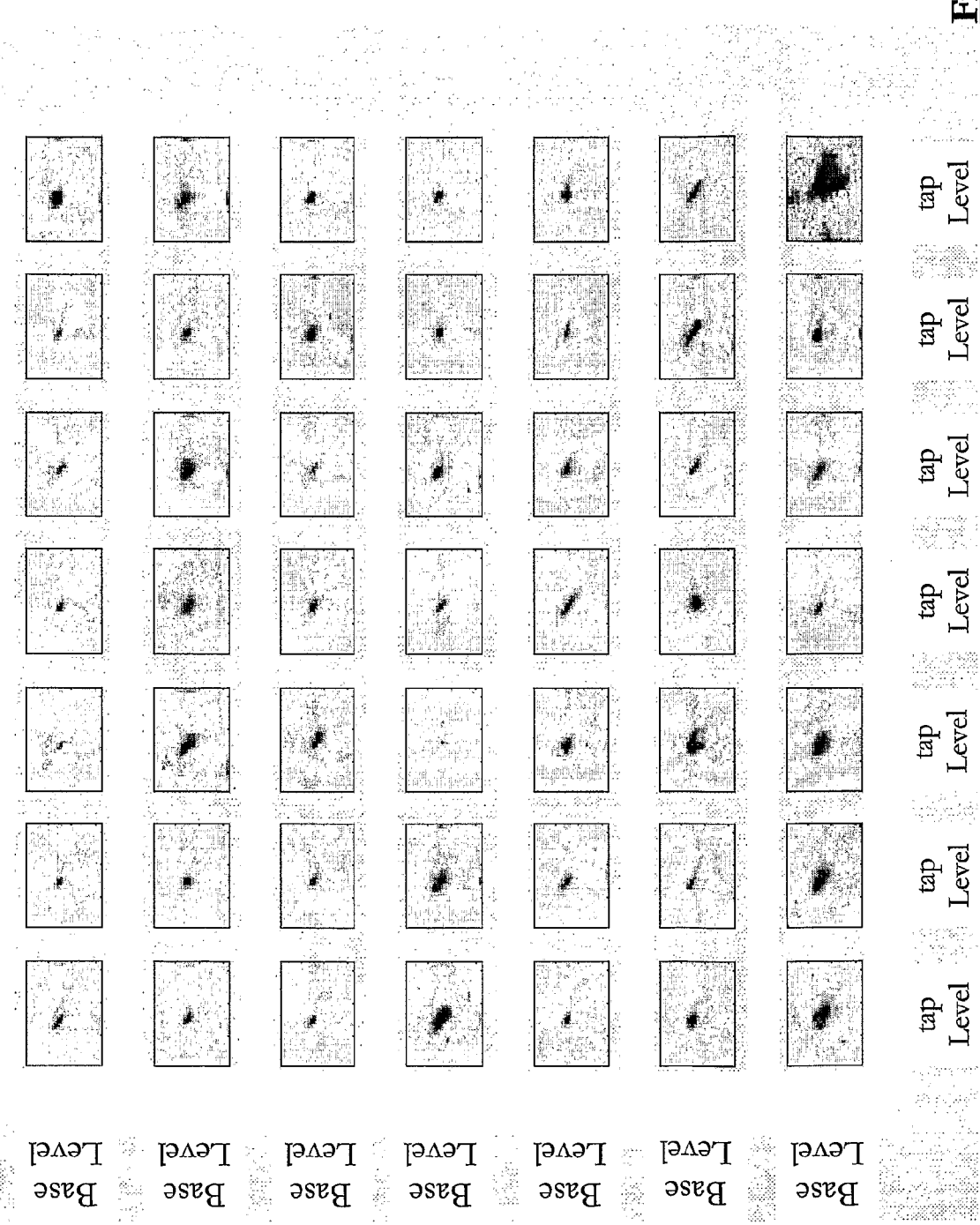
Figure 31:
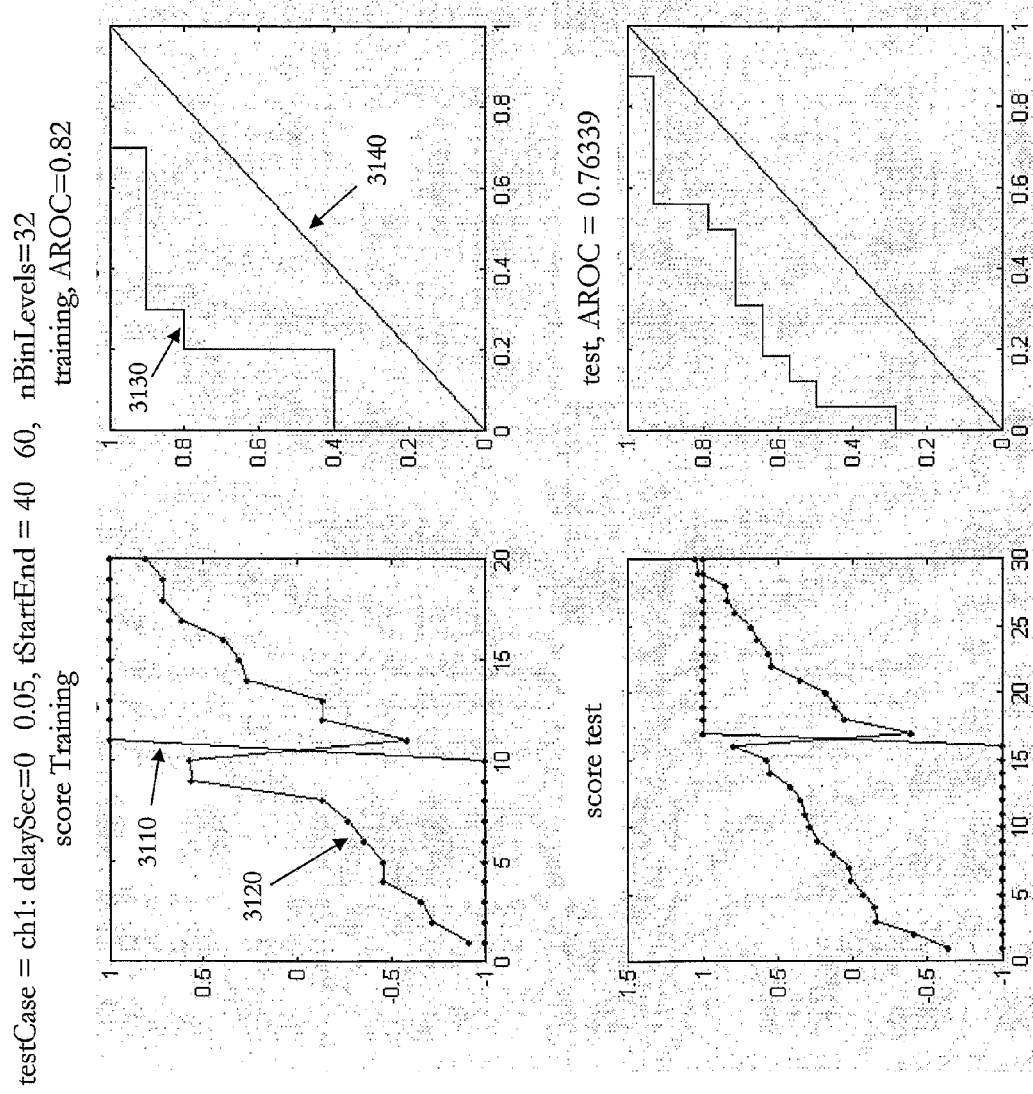
Figure 32:
Figure 33:
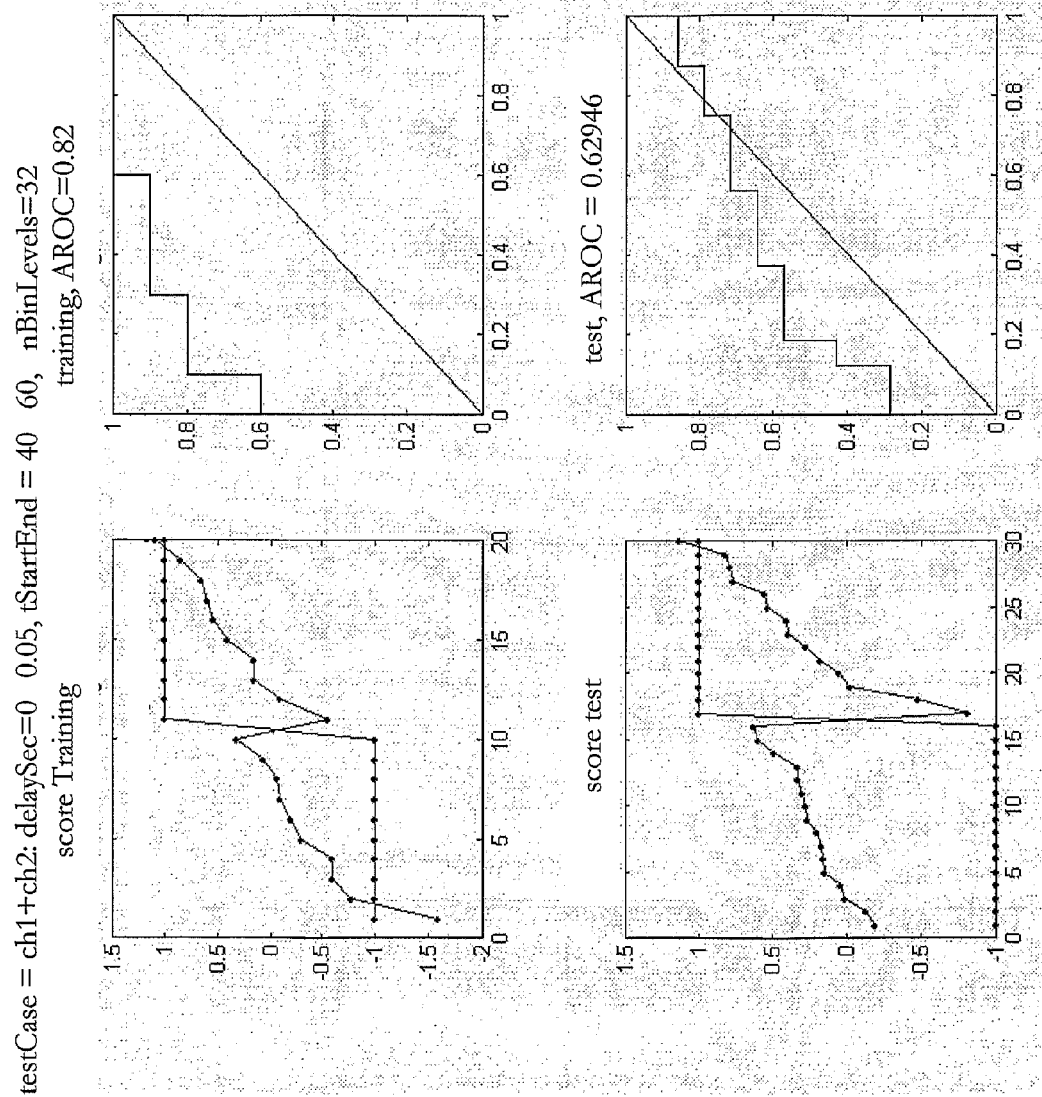

FIG. 7 provides a further illustration of the impact of dispersion upon a greyscale density scatter plot of the present invention, compared to a synchronous eye diagram;

FIG. 8 illustrates the impact of dispersion upon a greyscale density scatter plot of the present invention under varying levels of OSNR, compared to a synchronous eye diagram;

FIG. 9 illustrates the change in shape of the scatter plot with varying tap delay;

FIG. 10 illustrates a two dimensional histogram of a joint probability density function obtained by two tap sampling of a NRZ data signal, using a tap delay of 1 bit period;

FIG. 11 is a three dimensional scatter plot of sample sets obtained asynchronously from an impairment free optical signal, each sample set being derived from three tap points;

FIG. 12 illustrates results of using a machine learning algorithm using ridge regression and a linear kernel to predict impairment combinations typical in an optical network;

FIG. 13 illustrates the prediction accuracy of a linear kernel using the outputs of two sample taps at delay 1 bit period;

FIG. 14 illustrates the prediction accuracy of a non-linear kernel with polynomial kernel of degree 3 using the outputs of two sample taps at delay 1 bit period;

FIG. 15 illustrates the prediction accuracy of the linear kernel using the outputs of five sample taps at delays 1, ½, ¼, and ⅛ bit periods relative to the leading tap, respectively;

FIG. 16 illustrates the prediction accuracy of a non-linear kernel with polynomial kernel of degree 3 using the outputs of five sample taps at delays 1, ½, ¼, and ⅛ bit periods relative to the leading tap, respectively;

FIG. 17 illustrates the prediction accuracy of the linear kernel using a synchronous eye diagram as an input;

FIG. 18 illustrates the prediction accuracy of a non-linear kernel being a polynomial kernel of degree 3, using a synchronous eye diagram as an input;

FIGS. 19A and 19B illustrate prediction accuracy for the linear kernel and for a non-linear kernel, respectively, when taking an eye diagram as an input to the machine learning algorithm;

FIGS. 20A and 20B illustrate prediction accuracy for the linear kernel and for a non-linear kernel, respectively, when taking five tap sample sets as an input to the machine learning algorithm;

FIGS. 21A and 21B illustrate prediction accuracy for the linear kernel and for a non-linear kernel, respectively, when taking two tap sample sets as an input to the machine learning algorithm;

FIG. 22 illustrates phase portrait characteristics of RZ, NRZ and NRZ-DPSK modulated data signals and discernible changes allowing diagnosis of chromatic dispersion;

FIGS. 23 and 24 illustrate the efficacy of optical impairment prediction using machine learning in accordance with a further embodiment of the invention;

FIG. 25 provides an alternative representation of the data of FIG. 13 plus data for OSNR, illustrating the prediction accuracy for the linear kernel when taking two tap sample sets as an input to the machine learning algorithm;

FIG. 26 provides an alternative representation of the data of FIG. 14 plus data for OSNR, illustrating the prediction accuracy for the polynomial kernel of degree 3 when taking two tap sample sets as an input to the machine learning algorithm;

FIG. 27 illustrates conversion of electrocardiogram data into a two dimensional histogram of selected grid density in accordance with another embodiment of the invention;

FIG. 28 illustrates a plurality of two dimensional histograms having $2^2$ bins (grid elements) with tap delay of 0.05 s for a first channel recording of the electrocardiogram signal of FIG. 27;

FIG. 29 illustrates a plurality of two dimensional histograms having $6^2$ bins (grid elements) with tap delay of 0.05 s for the first channel recording of the electrocardiogram signal of FIG. 27;

FIG. 30 illustrates a plurality of two dimensional histograms having $32^2$ bins (grid elements) with tap delay of 0.05 s for the first channel recording of the electrocardiogram signal of FIG. 27;

FIG. 31 illustrates the efficacy of the present invention for predicting cessation of fibrillation from the histograms of FIG. 30;

FIG. 32 illustrates a plurality of two dimensional histograms having $32^2$ bins (grid elements) with tap delay of 0.05 s for the second channel recording of the electrocardiogram signal of FIG. 27; and FIG. 33 illustrates the efficacy of the present invention for predicting cessation of fibrillation from the histograms of FIG. 30 and FIG. 32.

Figure 34:
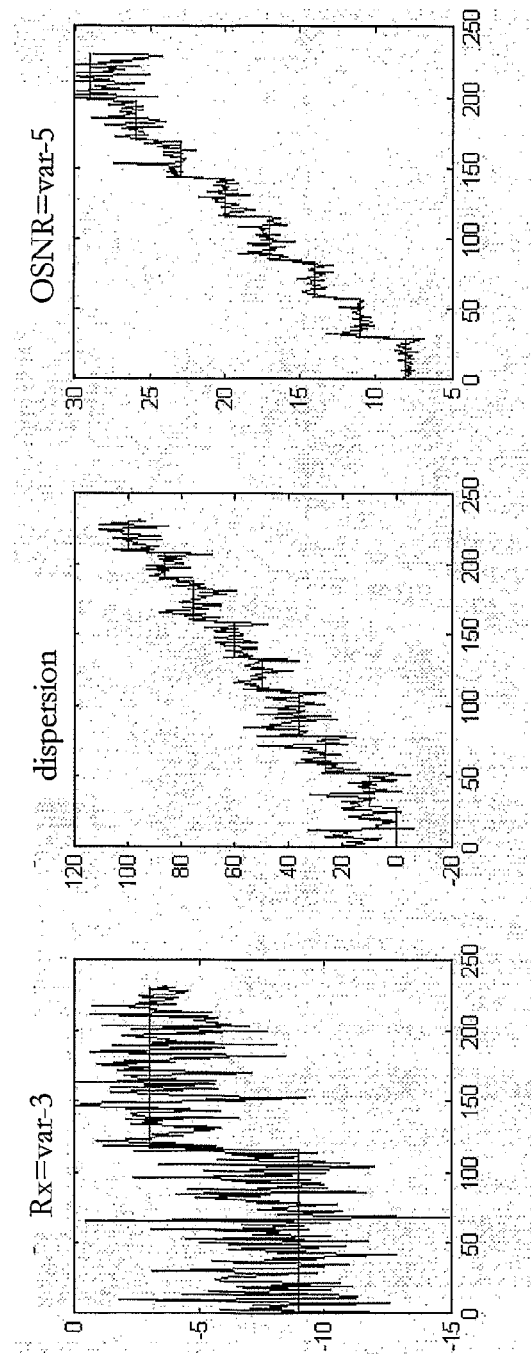

FIG. 34 illustrates a phase portrait that can be processed to predict the value of variables Rx, Disp and OSNR.

Figure 35:
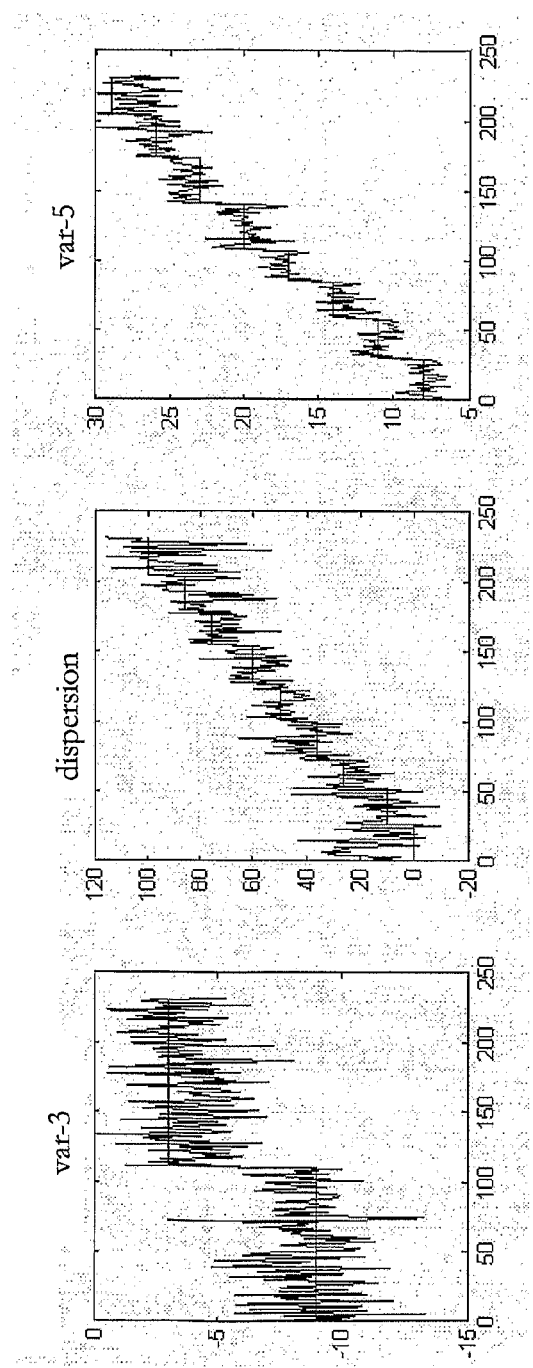

FIG. 35 illustrates a synchronous eye diagram that can be processed to predict the value of variables Rx, Disp and OSNR.

DESCRIPTION OF THE PREFERRED EMBODIMENTS

While the present invention has application to all types of signals from which signal characteristics can be diagnosed by machine learning processing of a phase portrait or probability density function of the signal, the embodiments here are described with particular reference to optical data signals and electrocardiogram signals.

FIG. 1 is a schematic of a two tap asynchronous sampling optical signal monitor 100 in accordance with the present invention. A small amount of optical power is tapped from a DWDM signal and the optical channel to be monitored is selected by a tunable optical filter 110 and then detected by a high speed receiver 120. The receiver output is passed through a two tap delay line and asynchronously sampled by a dual channel A/D sampler 130, and the sample pairs ($x_{1,n}$, $x_{2,n}$) are then passed to a processor 140 to build a probability density function of numerous such sample sets and apply a suitably trained machine learning algorithm to the collected sample sets. If x(t) denotes the optically demultiplexed channel then the sample pairs are given by:

$$x_{1,n} = x(nT_s)$$

$$x_{2,n} = x(nT_s + \Delta\tau)$$

where $\Delta\tau$ denotes the time between taps and $1/T_s$ is the sampling rate. The monitor 100 of FIG. 1 provides a simple implementation of the present invention, by use of a simple two tap delay line after the optical receiver 120 so as to effect the tap delay $\Delta\tau$ in the electrical domain.

FIG. 2 illustrates the timing of sampling of the optical signal by the monitor 100 of FIG. 1, in obtaining three sample pairs, namely ($x_{1,1}$, $x_{2,1}$), ($x_{1,2}$, $x_{2,2}$) and ($x_{1,3}$, $x_{2,3}$). It is to be noted that the time scale of FIG. 2 is not to scale in respect of $T_s$, as in the present embodiment the sampling rate $1/T_s$ is orders of magnitude slower than the bit rate, with many thousands of bits between samples. The sampling rate $1/T_s$ is unrelated to the bit rate, such that asynchronous sampling is performed.

In the embodiment shown in FIG. 2, the tap delay $\Delta\tau$ is a small fraction of the bit period, in effect giving an approximate measure of the slope and amplitude of the waveform. The tap delay $\Delta\tau$ may in other embodiments be larger than a fraction of a bit period, for example the tap delay $\Delta\tau$ may be approximately the same as the bit period.

Processor 140 builds a histogram representing the probability density function of the sample pairs, in the form of a two dimensional scatter plot of $x_2$ vs. $x_1$, also referred to as a two dimensional histogram of ($x_1$, $x_2$).

The results of simulations illustrating the asynchronous monitor's ability to differentiate the type and magnitude of optical signal impairments are shown in FIGS. 3 to 6.

Figure 3:
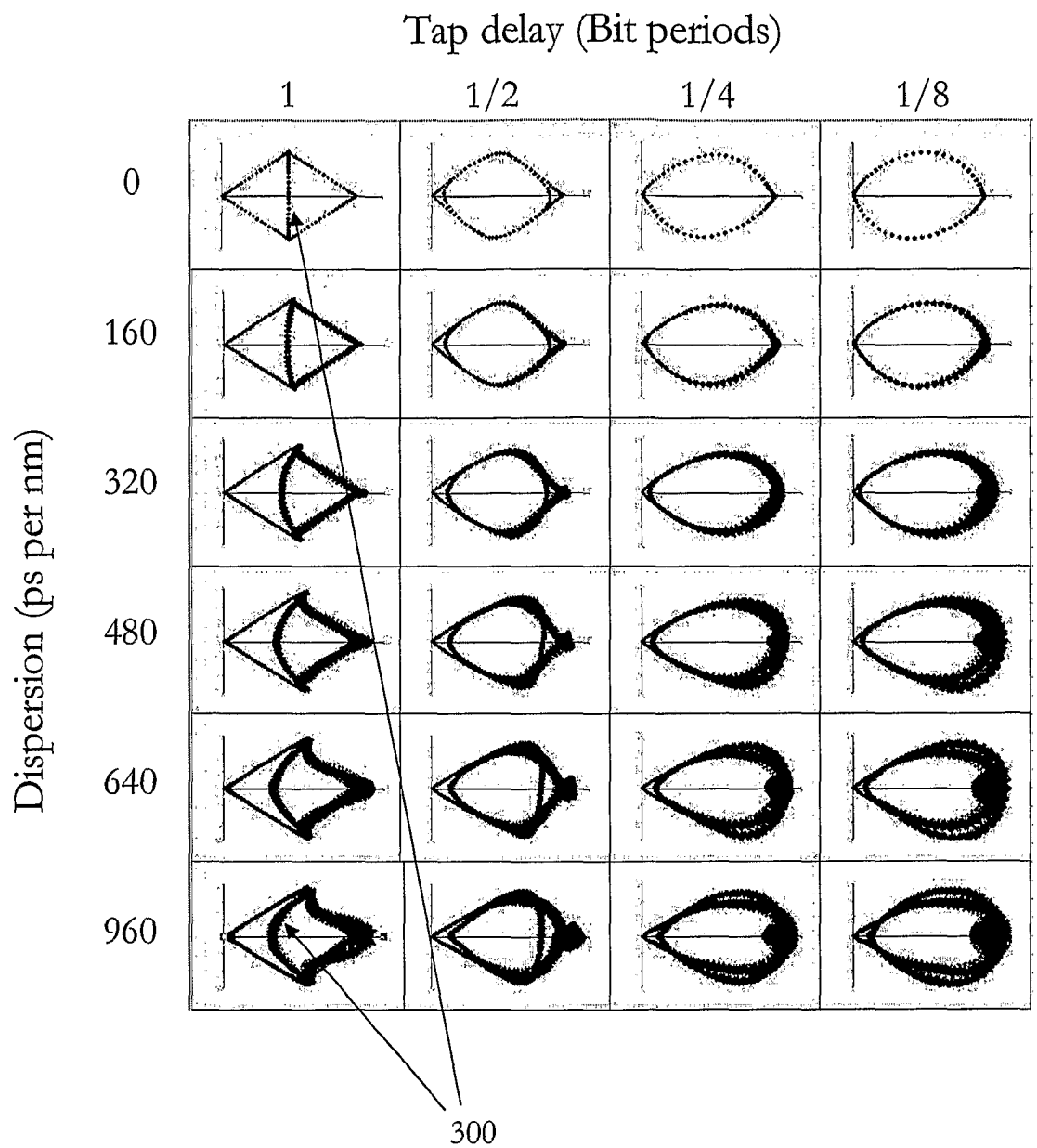
FIG. 3 illustrates the impact of dispersion upon simulated scatter plots of $(x_1-x_2)$ vs. $(x_1+x_2)$ for tap delays of 1 bit period, ½ bit period, ¼ bit period and ⅛ bit period.
Figure 4:
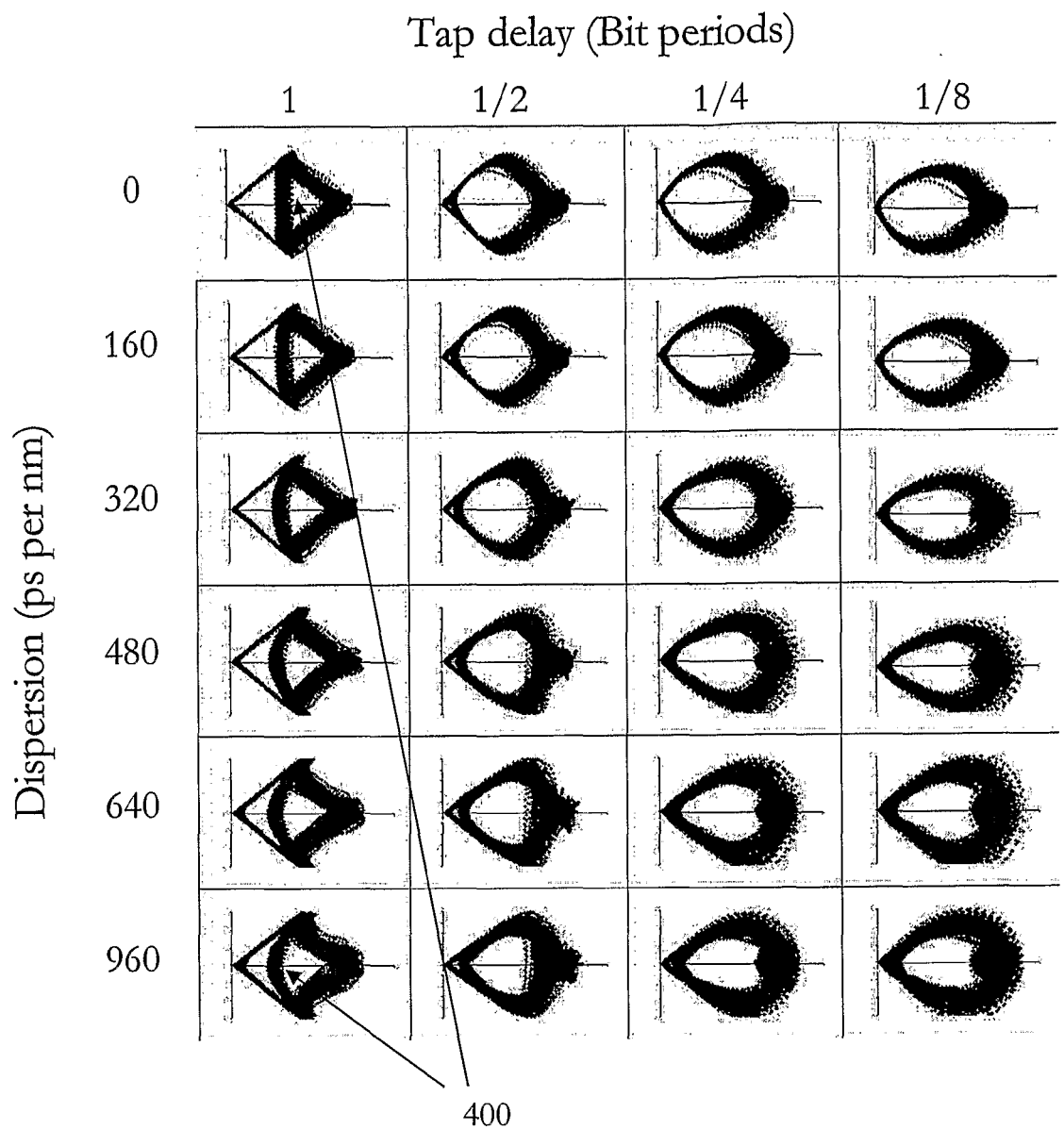
FIG. 4 illustrates the impact of dispersion upon simulated scatter plots of $(x_1-x_2)$ vs. $(x_1+x_2)$ for tap delays of 1 bit period, ½ bit period, ¼ bit period and ⅛ bit period, in the presence of ASE.

FIGS. 3 and 4 are each an array of scatter plots. Rather than plotting $x_2$ vs. $x_1$, the plots of FIGS. 3 and 4 are of ($x_1-x_2$) VS. ($x_1+x_2$) Scatter plots in each column of FIGS. 3 and 4 have been obtained with a common tap delay, from left to right being $\Delta\tau$=1 bit period, $\Delta\tau$=½ bit period, $\Delta\tau$=¼ bit period and $\Delta\tau$=⅛ bit period. Each row of scatter plots is obtained from a signal subject to a common amount of dispersion, from top to bottom being 0 ps/nm, 160 ps/nm, 320 ps/nm, 480 ps/nm, 640 ps/nm and 800 ps/nm.

FIGS. 3 and 4 show that the transition between (1, 0) and (0, 1), is a potential feature for diagnosing and monitoring dispersion. That is, dispersion has an identifiable signature on this transition in causing curvature towards the origin of the plot, as indicated at 300. While the signals sampled to produce the scatter plots of FIG. 3 were subject to no amplifier spontaneous emission (ASE), it is important to note that the signature of dispersion upon the (1, 0)-to-(0, 1) transition is still evident in the presence of ASE noise (OSNR=22 dB) as illustrated in FIG. 4 and indicated by 400. Other measures such as the degree of symmetry may also be useful distinguishing features.

Figure 5:
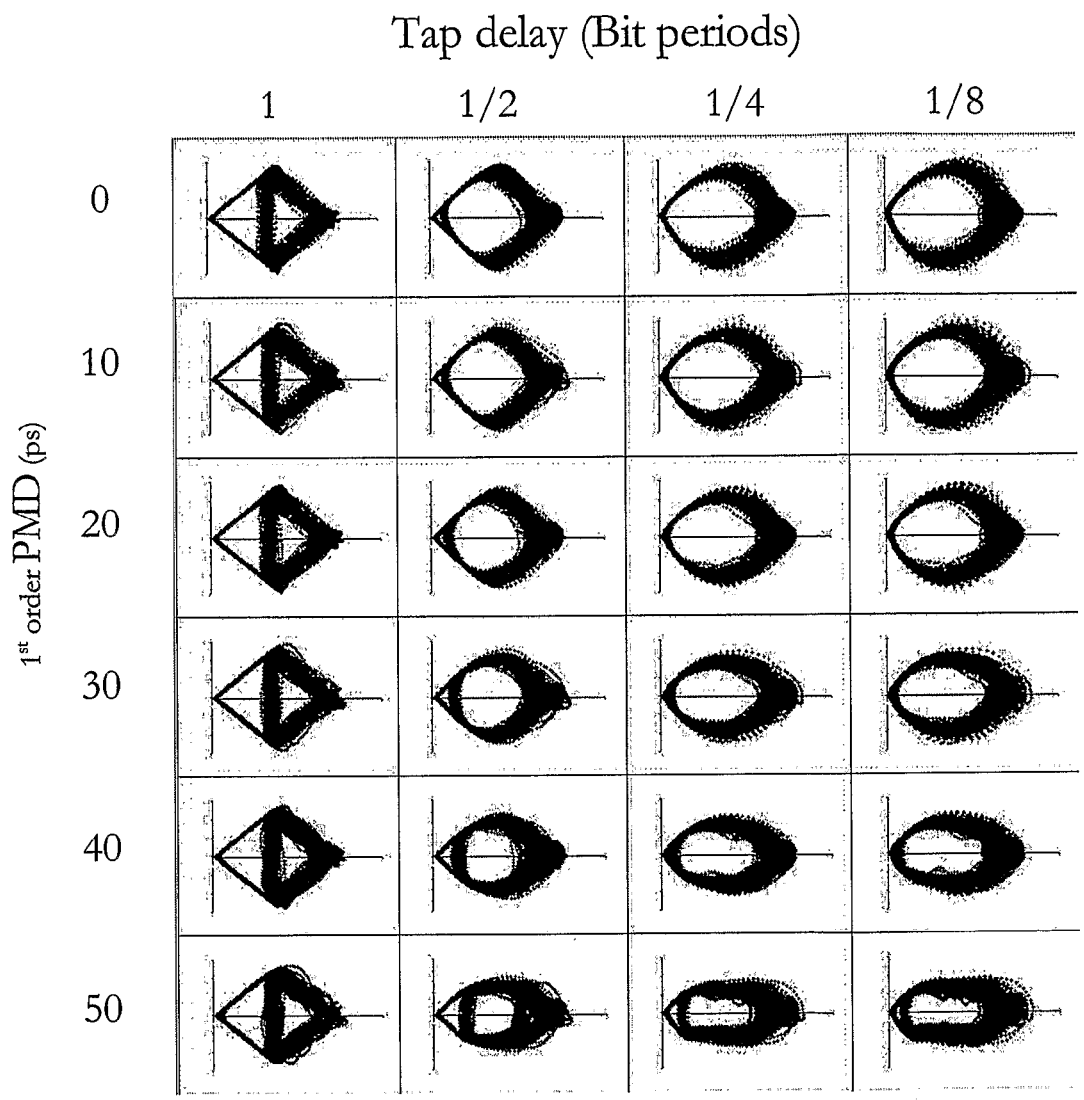
FIG. 5 illustrates the impact of first order PMD upon simulated scatter plots of $(x_1-x_2)$ VS. $(x_1+x_2)$ for tap delays of 1 bit period, ½ bit period, ¼ bit period and ⅛ bit period, in the presence of ASE.

FIG. 5 illustrates the impact of first order PMD upon plots of $(x_1-x_2)$ vs. $(x_1+x_2)$ for tap delays of 1 bit period, ½ bit period, ¼ bit period and ⅛ bit period, in the presence of ASE (OSNR=22 dB). Notably, as first order PMD increases from 0 to 50 ps, the scatter plots suffer notable flattening for tap delays of ½ bit period or less. That is, the (1, 0) region of the scatter plot moves towards the horizontal axis with increasing first order PMD, as does the (0, 1) region of the scatter plot. Once again, this or other signatures in the scatter plots may be useful signal characteristics identifiable by and/or influential upon the efficacy of the machine learning algorithm processing for example in diagnosing first order PMD, even in the presence of other degradation mechanisms such as ASE.

Figure 6:
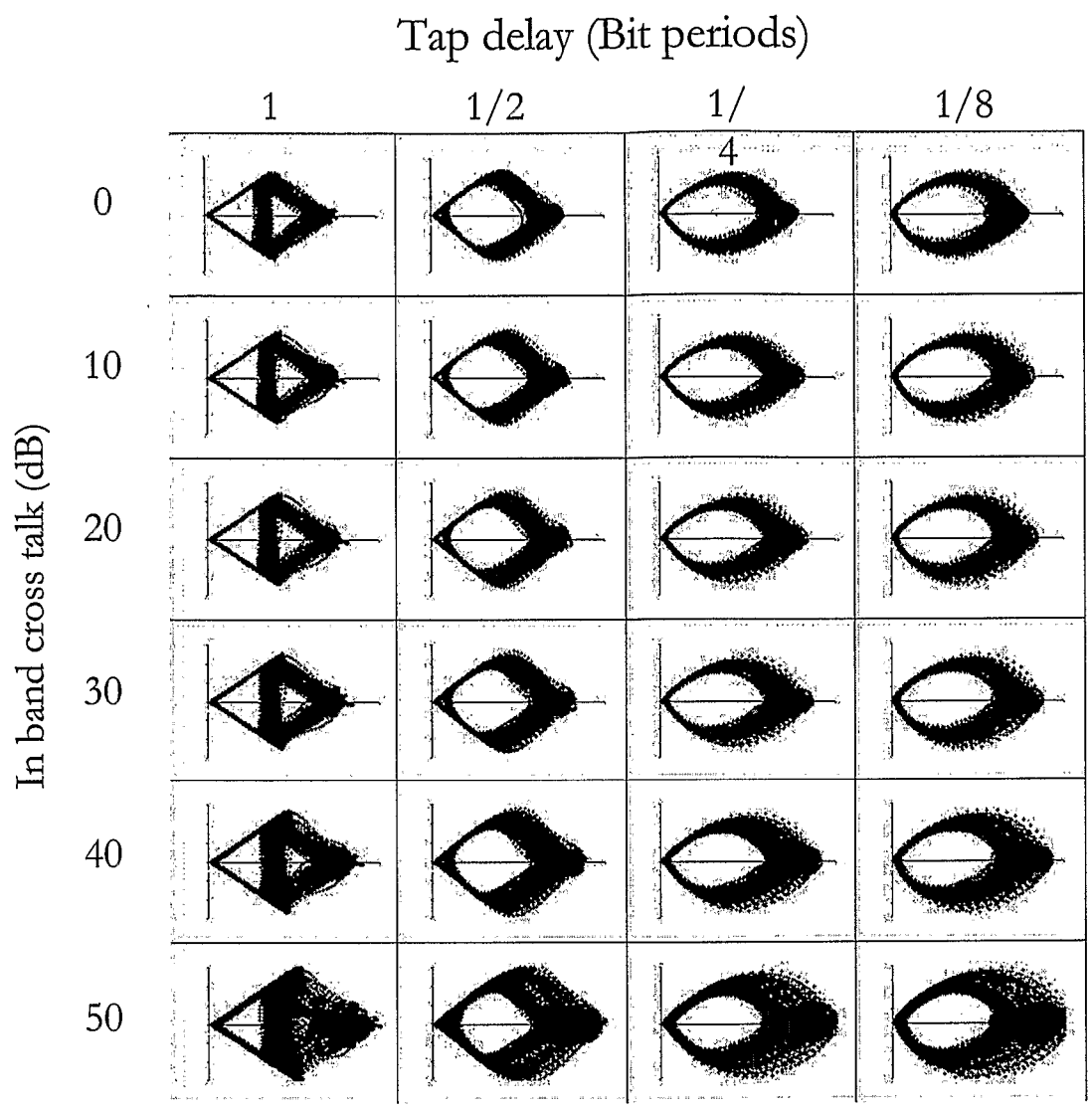
FIG. 6 illustrates the impact of in-band crosstalk upon simulated scatter plots of $(x_1-x_2)$ vs. $(x_1+x_2)$ for tap delays of 1 bit period, ½ bit period, ¼ bit period and ⅛ bit period.

FIG. 6 illustrates the impact of in-band crosstalk upon plots of $(x_1-x_2)$ vs. $(x_1+x_2)$ for tap delays of 1 bit period, ½ bit period, ¼ bit period and ⅛ bit period. A visual inspection of the two dimensional plots shows in-band crosstalk has a similar impact as ASE. Thus, in-band crosstalk is unlikely to be misdiagnosed as dispersion or first order PMD. While differentiating between in-band crosstalk and ASE may be difficult from the two dimensional plots of FIG. 6, extracting further information from the plurality of sample pairs may assist, for example a 3 dimensional scatter plot may be constructed in which sample density is plotted as the third dimension.

FIG. 7 provides a further comparison of the impact of dispersion upon the scatter plot of the present invention and a synchronous eye diagram. The upper four density histograms have been obtained from two-tap sampling of 10 Gbit/s NRZ modulated data with $\Delta\tau=1$ bit period. The lower four plots of FIG. 7 are each a synchronous eye diagram obtained from the same signal as the respective density histogram above for illustrative purposes. From left to right, the signal sampled to obtain the density histogram and synchronous eye diagram in each column was subject to a dispersion level of 0 ps/nm, 160 ps/nm, 400 ps/nm and 800 ps/nm, respectively. Notably, the triangle in the lower left corner of each two dimensional histogram undergoes significant 'closure' with increasing dispersion, as the diagonal transition curves towards the origin. On the other hand, the impact of such dispersion upon the eye diagrams is barely distinguishable.

FIG. 8 illustrates the impact of dispersion upon the density histogram of the present invention under varying levels of OSNR, compared to a synchronous eye diagram. All density histograms and eye diagrams of FIG. 8 have been obtained from 10 Gbit/s NRZ modulated data having net dispersion of 800 ps/nm. From left to right, the signal sampled to obtain the density histogram and synchronous eye diagram in each column possessed an OSNR of 25 dB, 30 dB and 35 dB, respectively. Again, the signature feature of dispersion in the two tap histograms, namely curvature of the diagonal transition towards the origin, is still plainly distinguishable even in adverse OSNR conditions. Once again, by contrast the eye diagrams show narrowing of the data peaks and broadening of the bases, but provide insufficient information for the human eye to quantify the amount of dispersion present.

An extra degree of freedom can be obtained by incorporating an adjustable delay $\Delta\tau$. For example FIGS. 3 and 4 suggest that the signature of dispersion is best seen with a delay $\Delta\tau$ equal to one bit period, whilst FIG. 5 indicates that the signature for first order PMD is best seen with a delay of ¼ bit period or less. The extra degree of freedom of an adjustable delay $\Delta\tau$ may thus be useful in separating and individually diagnosing combined sources of degradation.

FIG. 9 illustrates the change in shape of the scatter plot with varying tap delay, for an unimpaired signal. In FIG. 9, scatter plots are shown for each respective tap delay $\Delta t$=B/8, B/4, B/2 7B/8, 15B/16, B, 17B/16, 9B/8, 3B/2, 7B/4, 15B/8 and 2B, where B is the bit rate. It is again noted that for a delay of exactly one bit ($\Delta t$=B), a unique pattern forms. Thus, formation of this unique pattern can be used to confirm that a tap delay is equal to the bit rate, so that knowledge of the tap delay enables diagnostic determination of the bit rate. Notably, the pattern for tap delay of two bits ($\Delta t$=2B) is distinct from the pattern for tap delay equal to one bit, in that the former possesses both diagonal transitions whereas the latter possesses only one diagonal transition. As can be seen for the scatter plots of $\Delta t$=15B/16 and 17B/16, even slight variations of tap delay away from 1 bit period causes loss of the degeneracy of the diagonal transition, which becomes two separate curves.

For delays less than B/2, the plots are representative of the power evolution within each bit. The waveform increases along the lower curve for a 0→1 transition, and falls back along the upper curve for the 1→0 transition.

While the preceding embodiments have been described with reference to a monitor possessing two sample taps, it is to be noted that alternate embodiments of the invention may extract more information about the waveform, and about distortion of the waveform, by using an increased number of taps. For example three taps could yield information regarding the distribution of signal curvatures.

Thus, the present embodiments of the invention enable diagnostic differentiation between degradation types (ASE vs. dispersion vs. PMD vs. in-band crosstalk etc). This is an important capability in the field of optical networks, with potential to be of increasing value as multipath optical networks become increasingly sophisticated.

While the preceding description of the preferred embodiments, and attached FIGS. 1 to 9, relate to two tap sampling with a time delay between the taps, it is to be appreciated that other embodiments of the present invention may utilise tap points which are distinct from each other in an alternative way. For example, a range of optical and/or electrical pre-processing of the signal may be performed prior to the sampling tap points.

Further types of signal to which the present invention may have application will now be described with reference to FIG. 22. The implementation of practical all-optical networking requires cost-effective, yet flexible monitoring, to enable proper management of complex DWDM systems that can carry multiple modulation formats on the same fiber. Amplitude Shift Keyed (ASK) formats such as Non Return to Zero (NRZ) and Return to Zero (RZ) are already ubiquitous in current DWDM systems, and phase modulated formats such as Differential Phase Shift Keyed (DPSK) will become more common as line-rates increase from 10 Gbit/s to 40 Gbit/s, due to their increased robustness. Ideally, optical monitoring should be able to cope with all these formats. To further complicate requirements, monitoring may also be needed at various points in the network where chromatic dispersion is unlikely to be equalised, e.g. at Reconfigurable Optical Add Drop Multiplexers (ROADM's), hindering clock extraction.

For modulation format generation for the signals of FIG. 22 a single 10 Gbit/s channel was used for the comparison, using a PRBS of $2^{23}-1$. NRZ and 50% duty-cycle RZ were generated by a pair of appropriately biased MZ modulators. NRZ-DPSK was produced from a separate intensity-modulated MZ modulator biased to give the required $\pi$ phase-shift between transitions. Producing DPSK in this manner avoids the problems of chirp generation that occurs in phase modulators when driving conditions are sub-optimal. The modulated channel was then passed through various lengths of single mode fiber to add chromatic dispersion. The overall loss was kept constant by an optical attenuator. All three formats were monitored with the same receiver arrangement, consisting of a Fabry-Perot optical filter with a 3 dB bandwidth of 10 GHz, and an electrically amplified pin photodiode with a bandwidth of 15 GHz. A 3 dB RF power splitter and delay line were used to provide two electrical signals with a 1 bit (100 ps) delay to a digital communications analyzer, which either sampled one signal synchronously to produce standard eye diagrams or both signals asynchronously to produce two dimensional histograms suitable for assessment by a machine learning algorithm.

The modulation format comparison is illustrated in FIG. 22, which shows both the eye diagrams and the corresponding phase portraits, as the dispersion was increased from 0 km to 100 km of single mode fiber, in 25 km steps. Beyond 50 km, RZ is of less interest as the degradation is extreme. Instead, we show for comparison an inset of RZ and NRZ through a much broader 70 GHz optical filter with no dispersion.

Implications for monitoring: the phase portraits of FIG. 22 show distinct differences between the three modulation formats, highlighting the potential for modulation format recognition by machine learning. Within each format, the portraits also show characteristic, but differing, changes with increasing dispersion. For example, the NRZ diagonal curvature has been shown in the preceding, with reference to FIGS. 3 and 4 for example, to have a direct measure of chromatic dispersion. Similarly, the RZ phase portrait shows splitting in the bottom left corner that eventually forms into a box shape as has also been noted for a broad optical bandwidth. The power of the delay-tap technique is particularly evident in the NRZ-DPSK plots. As dispersion increases the slope changes in the crossovers of the standard eye diagram are much harder to detect than the signatures evident in the NRZ-DPSK phase portraits, particularly the reversed curvature of the diagonal, and disappearance of the bottom and left sides of the phase portraits.

We note that using narrowband filters instead of delay interferometer DPSK receivers produces different performance, however this is not a significant issue for monitoring purposes. As seen in FIG. 22c, the NRZ-DPSK eye with narrowband filtering initially improves with increasing dispersion before it begins to degrade; an effect which has been used to extend the reach of DPSK transmission. Conversely, DPSK with interferometric receivers and broader optical filters is continuously degraded with increasing dispersion. However, the differences in the phase portraits in FIG. 22c show that this effect can be accounted for with prior calibration.

FIG. 26b is a two dimensional histogram in which the x and y axes represent the sample set values, and the z axis represents the sample density obtained in each sub-area of the phase portrait.

While FIGS. 1 to 10 relate to two tap points, it is further to be appreciated that these or other combinations of features may be implemented in still further embodiments utilising three or more tap points. FIG. 11 is a three dimensional scatter plot of sample sets obtained asynchronously from an impairment free optical signal, each sample set being derived from three tap points. A time delay of 1 bit is imposed between the first and second sample tap points, and between the second and third tap points. As is the case for the two dimensional scatter plots in other Figures, it is noted that certain 'transitions' are not possible and thus no points appear on such transitions. For example, it is not possible for a point to exist on the transition from (1,1,1) to (0,0,0), among other impossible transitions.

The preceding figures illustrate the capability and versatility of such scatter plots or constellation diagrams, phase portraits, probability density functions and two or greater dimensional histograms to isolate features which have the potential to enable diagnostic differentiation between impairments. For example the curvature evident in the lines representing the 010 and 101 transitions is strongly related to chromatic dispersion.

The present invention further recognises that machine learning may be applied to assist in such diagnosis of signal impairment type and/or severity. Thus, in accordance with the present invention the processor 140 of FIG. 1 includes a signal processing module 150 that automatically identifies and quantifies the signal characteristics present in the signal waveform, such as channel impairments or signal source characteristics. The processing module may be based on supervised learning techniques. These techniques include but are not limited to:

regression,
ridge regression,
support vector regression.

Any of these techniques can be used with a linear kernel $$k(x, x') = x \cdot x' = \sum_{i=1}^{d} x_i x'_i$$

or a non-linear kernel, such as a polynomial kernel of degree p:

$$k(x,x')=(x \cdot x'+1)^p$$

for $x=(x_i)$, $x'=(x'_i) \in R^d$. Other supervised learning techniques could be used here as well. The training sets for supervised learning may be created from simulations, experimental measurements or a combination of both. In the preferred embodiment described here, the output from the asynchronous monitor, whether obtained by two or more sample taps, is processed into a two or more dimensional histogram prior to training, such as the two dimensional histogram illustrated in FIG. 10. For example, the volume occupied by the sample points illustrated in FIG. 11 may be divided into many sub-volumes, which allows creation of a three dimensional histogram which represents the number of sample points falling within each sub-volume.

As an example training sets for a two tap asynchronous monitor with linear kernel have been generated by simulating a typical optical network, with a variety of simultaneous impairments. The impairments modeled (ranges) were:

OSNR (15-27 dB)
Dispersion (0-1600 ps/nm)
Modulator Chirp (−1.5 to 1.5)
Filter Detuning (−20 to +20 GHz)
PMD (0-50 ps)

Sets of asynchronous samples with a tap delay of 1 bit period were created for 7000 randomly generated combinations of impairments. These sample sets were then used as input and validation for a model based on Ridge regression.

Results are shown in FIG. 12. The graphs show the predicted values (y-axis) versus the "true" value (x-axis) for Dispersion, Chirp (TX), Filter offset and PMD (DGD), for the link suffering five simultaneous impairments, with no significant level of OSNR being present. Selected predictions for particular values for all five impairment types are shown in Table 1 below, in the format (true value)/(prediction):

TABLE 1

| Disp (ps/nm) | PMD (ps) | Tx chirp | Freq off (GHz) |
|---|---|---|---|
| 0/39 | 0/20 | +1.5/+0.6 | 0/−1 |
| 640/490 | 20/20 | −1.5/−1.0 | −5/4 |
| 1280/1270 | 10/16 | −0.5/−1.0 | 20/5 |
| 1280/1250 | 30/24 | 0/+0.1 | 10/8 |
| 640/530 | 30/26 | 1.5/1.4 | −20/−17 |
| 640/625 | 10/11 | 1.5/0.6 | −10/−13 |
| 320/460 | 20/30 | 1.5/0.6 | 0/−6 |
| 1600/1570 | 20/17 | 0.5/0.51 | −15/−9 |
| 1280/1330 | 50/50 | −1.5/−1 | 10/9 |
| 320/200 | 10/15 | 0/0 | 10/1 |

FIG. 13 illustrates the prediction accuracy of a linear kernel using the outputs of two taps at delay 1 bit period and asynchronously sampled, by plotting Variance Explained for each impairment. From left to right Variance Explained values are provided for, dispersion (ps/nm), optical power (dBm), crosstalk (dBm), PMD (Ps), Df (GHz), r (dB), jitter period and Q. Prediction accuracy can be seen to be relatively high for dispersion (ps/nm), crosstalk (dBm), PMD (ps), Df (GHz), Jitter period and Q, and somewhat accurate for r (dB). Prediction accuracy is poor for optical power when using a linear kernel, however it is noted that there is relatively little need for optical power prediction as standard optical power meters suffice. Power variation is included in these simulations as prediction is needed to be effective in the presence of varying power levels.

FIG. 14 illustrates the prediction accuracy of a non-linear kernel with polynomial kernel of degree 3 using the outputs of two taps at delay 1 bit period and asynchronously sampled, by plotting Variance Explained for each impairment. From left to right Variance Explained values are provided for, dispersion (ps/nm), optical power (dBm), crosstalk (dBm), PMD (ps), Df (GHz), r (dB), jitter period and Q. Relative to FIG. 31, prediction accuracy can be seen to have improved for r (dB) when using such a non-linear kernel.

Next a multi tap (5 tap) asynchronous monitor with a machine learning algorithm was tested. In this experiment we used multiple taps at delays 1, ½, ¼, and ⅛ bit periods relative to the leading tap, respectively. First a linear kernel was applied to the obtained samples, with results shown in FIG. 15. From left to right Variance Explained values are provided for, dispersion (ps/nm), optical power (dBm), crosstalk (dBm), PMD (ps), Df (GHz), r (dB), jitter period and Q. Prediction accuracy can be seen to be relatively high for dispersion (ps/nm), crosstalk (dBm), PMD (ps), Df (GHz), Jitter period and Q, and somewhat accurate for r (dB). Prediction accuracy is poor for optical power when using such a linear kernel with 5 taps.

Next a non linear kernel being a polynomial kernel of degree 3 was applied to the obtained samples, with results shown in FIG. 16. From left to right Variance Explained values are provided for, dispersion (ps/nm), optical power (dBm), crosstalk (dBm), PMD (ps), Df (GHz), r (dB), jitter period and Q. Prediction accuracy can be seen to be relatively high for dispersion (ps/nm), crosstalk (dBm), PMD (ps), Df (GHz), Jitter period and Q, and somewhat accurate for r (dB). Prediction accuracy is poor for optical power when using such a non-linear kernel with 5 taps.

The present invention further recognises that kernel based machine learning techniques may be used to identify and quantify multiple simultaneous impairments from synchronous eye diagrams. FIG. 17 illustrates the prediction accuracy of a linear kernel using a synchronous eye diagram as an input, by plotting Variance Explained for each impairment. From left to right Variance Explained values are provided for, dispersion (ps/nm), optical power (dBm), crosstalk (dBm), PMD (Ps), Df (GHz), r (dB), and Q. Prediction accuracy can be seen to be relatively high for r (dB), but poor for other impairments when using a linear kernel to predict impairments from a synchronous eye diagram.

FIG. 18 illustrates the prediction accuracy of a non-linear kernel being a polynomial kernel of degree 3, using a synchronous eye diagram as an input, by plotting Variance Explained for each impairment. From left to right Variance Explained values are provided for, dispersion (ps/nm), optical power (dBm), crosstalk (dBm), PMD (Ps), Df (GHz), r (dB), and Q. Prediction accuracy can be seen to be relatively high for r (dB), and relative to FIG. 17 the prediction accuracy for dispersion and Q has improved. However prediction accuracy remains poor for other impairments when using a non linear kernel to predict impairments from a synchronous eye diagram.

FIG. 19 illustrates prediction accuracy for the linear kernel (FIG. 19A) and for a non-linear kernel (FIG. 19B) when taking an eye diagram as an input to the machine learning algorithm.

FIG. 20 illustrates prediction accuracy for the linear kernel (FIG. 20A) and for a non-linear kernel (FIG. 20B) when taking five tap sample sets as an input to the machine learning algorithm. The tap delays, relative to the first sample tap, were ⅛, ¼, ½ and 1 bit.

FIG. 21 illustrates prediction accuracy for the linear kernel (FIG. 21A) and for a non-linear kernel (FIG. 21B) when taking two tap sample sets as an input to the machine learning algorithm, with tap delay of 1 bit period.

FIGS. 19 to 21 show the performance in predicting each impairment. For FIGS. 19B, 20B and 21B, the polynomial kernel used was of degree 3. Each plot of FIGS. 19 to 21 has been restricted to show Variance Explained between 0 and 1 only, so boxes not visible show that impairment is being predicted poorly. The impairments are, from left to right: D (Dispersion), Popt (Optical Power), P_Xtalk (Crosstalk), PMD (Polarisation mode dispersion), Df (Digital filter frequency), r (Extinction rate), Jitter, and Q. For FIGS. 19 to 21, each impairment was tested using a 2000/1000 test/train split, with 50 permutations (compared with 25 permutations used in generating the results of FIGS. 13 to 18). For each impairment, the box and whisker diagrams indicate the median, 1st, and 3rd quartile. The dark line indicates the median of the 50 runs (permutations), the lower end of the box indicates the 1st quartile (25%), and the upper end of the box indicates the 3rd quartile (75%). Thus 50% of the runs lie within the box. The whiskers extend from the boxes to 1.5 times the inter-quartile distance. The circles are extreme values that lie outside the whiskers.

FIG. 25 provides a representation of prediction accuracy which is an alternative representation to that of FIGS. 12-21. The data used for the predictions which produced FIG. 25 comprised two tap phase portraits with tap delay of 1 bit period, sampled from an optical signal for which it was desired to predict dispersion (ps/nm), optical power (dBm), crosstalk (dBm), PMD (ps), Df (GHz), r (dB), jitter period and Q and OSNR. FIG. 25 illustrates the prediction accuracy for the linear kernel when taking two tap sample sets as an input to the machine learning algorithm. FIG. 25 provides a plot of normalised error range for predictions at varying levels of each type of impairment. The impairment types assessed and plotted are, starting at top left and proceeding in a clockwise direction, OSNR, D, PMD, Df, Q stat, Q BER, Jitter and P. As can be seen the error range is small, and prediction accuracy is high, for OSNR, Q BER and Q stat. Jitter is predicted with almost as much accuracy, while D, PMD and Df are moderately accurately predicted. P is least accurately predicted.

FIG. 26 illustrates the prediction accuracy when applying the polynomial kernel of degree 3 to the same data as FIG. 25. When compared to FIG. 25, it can be seen by eye that the polynomial kernel in general provides somewhat improved prediction accuracy, Some observations can be made from FIGS. 19 to 21 and FIGS. 25 and 26. Firstly, switching from a linear kernel to a polynomial kernel results in an increase in performance. This is especially true in the case of the eye diagram, for which prediction accuracy improves considerably for D, P_XTalk, PMD, Df, and Q. A further observation is that there is a performance increase between the multitap and two tap cases. While this is true for both the linear and polynomial kernel, it is especially noticeable when using the linear kernel. Additionally, comparing the synchronous eye diagram to the asynchronous diagrams shows that the asynchronous method performs better using either kernel. This shows that for the models used it is easier to predict the impairments from the asynchronous data. However, in alternative applications, applying the present invention to a synchronous eye diagram may be equally or even more effective than to an asynchronous phase portrait. FIGS. 34 and 35 illustrate one such application.

FIG. 34 provides experimental results obtained by sampling a 10 Gbit/s optical signal to produce a phase portrait, when using a tap delay of ½ bit. The phase portrait was processed by a machine learning algorithm comprising a linear kernel in order to predict the value of each of three variables, namely Rx (received power (dBm)), Disp (chromatic dispersion (ps/nm)) and OSNR (dB), while other impairments present but not predicted included $1^{st}$ order PMD. The real value of each of the three predicted impairments was set to one of the discrete settings as shown by the clean stepwise trace in each plot of FIG. 34. The prediction values returned by the algorithm are illustrated as the second trace on each plot, and show that prediction is able to follow the actual value of each impairment with promising accuracy, across a range of values of each impairment.

FIG. 35 provides experimental results obtained by sampling a 10 Gbit/s optical signal, but this time in order to produce a conventional synchronous eye diagram. The eye diagram was processed by a machine learning algorithm comprising a linear kernel in order to predict the value of each of three variables, namely Rx (received power), Disp (dispersion) and OSNR, while other impairments present but not predicted included $1^{st}$ order PMD. The real value of each of the three predicted impairments was set to one of the discrete settings as shown by the clean stepwise trace in each plot of FIG. 35. The prediction values returned by the algorithm are illustrated as the second trace on each plot, and show that prediction is able to follow the actual value of each impairment with promising accuracy, across a range of values of each impairment. FIGS. 34 and 35 illustrate that the present invention is roughly equally applicable to asynchronous phase portraits as to synchronous eye diagrams under such signal conditions.

FIG. 23 illustrates the efficacy of impairment prediction utilising the machine learning algorithms discussed in the preceding with reference to FIGS. 12-21. FIG. 23A illustrates a portion of an NRZ signal trace for a signal having the impairment levels set out at top left of FIG. 23, and also set out in Table 2 below. FIG. 23B illustrates the phase portrait, and FIG. 23C illustrates the eye diagram, for the signal of FIG. 23A.

TABLE 2

|  | Actual | Machine Prediction |
| --- | --- | --- |
| Dispersion (ps/nm) | 1132.43 | 1255.09 |
| OSNR (dB) | 23.96 | 24.02 |
| Filter Offset (GHz) | 4.38 | 5.68 |
| PMD (ps) | 35.32 | 34.19 |
| Jitter (%) | 6.6 | 6.15 |
| Q (from error rate) | 7.18 | 7.22 |

As can be seen from Table 2, the machine predictions obtained from the phase portrait of FIG. 23B provide quite good accuracy compared to the actual impairment values. Further, by simulating many such signals with varying levels of impairments and determining prediction accuracy for each such sample from a phase portrait of the type shown in FIG. 23B, the regression plots of FIG. 23D are produced, illustrating that machine prediction is very accurate for OSNR, Jitter and Q, and has promising levels of accuracy for dispersion, filter offset and first order PMD. FIG. 23E provides a further illustration of the prediction accuracy for ten such sample signals with distinct impairment levels.

FIG. 24 illustrates the efficacy of impairment prediction utilising the machine learning algorithms discussed in the preceding with reference to FIGS. 12-21 and 33. FIG. 24A illustrates a portion of an NRZ signal waveform for a signal having the impairment levels at top left of FIG. 24, and repeated in Table 3 below. FIG. 24B illustrates the phase portrait, and FIG. 24C illustrates the eye diagram, for the signal of FIG. 24A.

TABLE 3

|  | Actual | Machine Prediction |
| --- | --- | --- |
| Dispersion (ps/nm) | 1564.61 | 1324.07 |
| OSNR (dB) | 8.33 | 8.09 |
| Filter Offset (GHz) | 3.25 | 9.16 |
| PMD (ps) | 49.67 | 43.82 |
| Jitter (%) | 39.4 | 40.44 |
| Q (from error rate) | 1.23 | 1.31 |

Figure 24A:
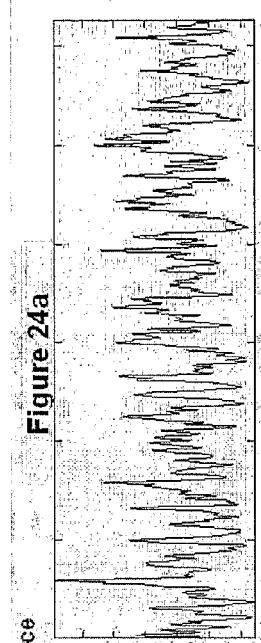
Figure 24C:
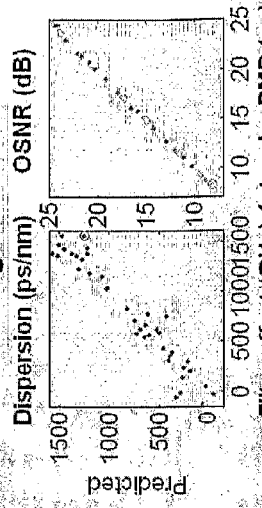
Figure 24D:
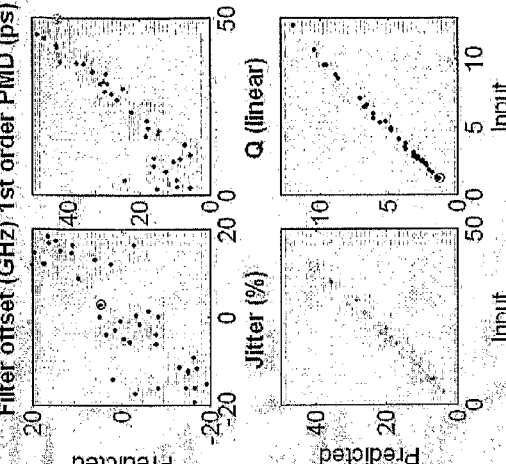
Figure 24B:
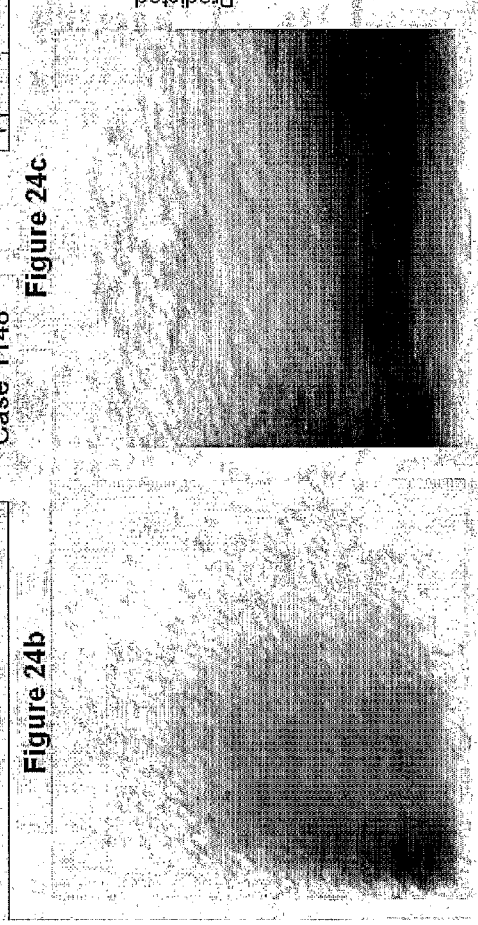
Figure 24E:
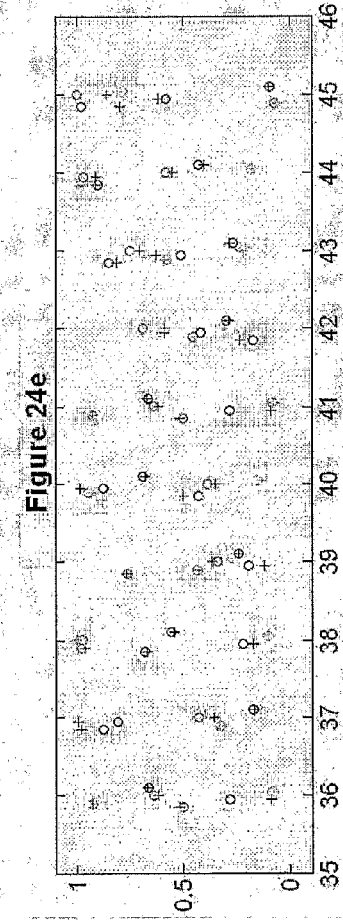

As can be seen from Table 3, the machine predictions obtained from the phase portrait of FIG. 24B provide reasonable accuracy compared to the actual impairment values. The results of FIG. 24D were obtained by simulating many such signals with varying levels of impairments, notably with severe OSNR in the range of 8 to 1 dB for every such signal. The effect of such severe OSNR impairment is evident from the phase portrait of FIG. 24B and the eye diagram of FIG. 24C. Prediction accuracy was determined for each such sample from a phase portrait of the type shown in FIG. 24B to produce the regression plots of FIG. 24D, illustrating that even in the presence of such severe OSNR degradation, machine prediction is very accurate for OSNR, Jitter and Q, and has promising levels of accuracy for dispersion, filter offset and first order PMD. FIG. 24E provides a further illustration of the prediction accuracy for ten such sample signals with distinct impairment levels.

While the preceding embodiments have been described with reference to machine learning prediction of optical signal impairments from two or greater dimensional histograms, it is to be appreciated that the present invention has application to many other signal types where signal characteristics can be predicted by use of such machine learning algorithms applied to two or greater dimensional histograms and phase portraits. Accordingly, provided below is an example in which the present invention has been applied in prediction of cessation of atrial fibrillation, by assessment of sensed electrocardiogram signals obtained from hearts undergoing atrial fibrillation.

The ECG data used was obtained from the AF (atrial fibrillation) Termination Challenge Database at http://www.physionet.org/phvsiobank. Recordings are each one minute in length (excerpted from longer recordings) and each recording contains two simultaneously recorded ECG signals (channels). The cardiac rhythm is atrial fibrillation in each case. Annotation sets have not been used. The classification problem is to identify the following groups:

Class A: non-terminating AF (defined as AF that was not observed to have terminated for the duration of the long-term recording, for at least an hour following the one minute segment); and Class B: AF that terminates within one minute after the end of the record, including AF that terminates immediately (within one second) after the end of the record.

FIG. 27 illustrates conversion of such electrocardiogram data into a two dimensional histogram of selected grid density in accordance with this embodiment of the invention. FIG. 27A illustrates one sample of this ECG cardiac data. The processing applied to each such segment of data involved obtaining multiple sample sets comprising two sample separated by a tap delay of 0.05 s, and plotting the sample sets into a scatter plot, as shown in FIG. 27b. The three copies of the scatter plot in FIG. 27b are provided to illustrate that the two dimensional histograms of FIG. 27c are all produced from the same scatter plot, simply by altering a grid spacing, so that different bin sizes (resolution) is taken from the original time series data.

In this example the high resolution two dimensional phase portrait or scatter plot of FIG. 27B is subsequently converted into two dimensional phase histograms of different (equal to or lower) resolutions, each shown in FIG. 27C. In the examples shown in FIG. 27C, $2^2$, $6^2$ and $25^2$ bins were used, respectively. Note that in general the bin size may vary within a single phase portrait, for example with greater resolution in areas of the scatter plot having higher point density, and lesser resolution in areas of the scatter plot having lower (or zero) point density. Alternatively low resolution phase histograms may be created from low resolution sampling of the time series data. The horizontal and vertical axes on the plots are the first and second samples, respectively.

FIG. 28 illustrates a plurality of two dimensional histograms having $2^2$ bins with tap delay of 0.05 s for a first channel recording of the electrocardiogram signal of FIG. 27. FIG. 29 illustrates a plurality of two dimensional histograms having $6^2$ bins with tap delay of 0.05 s for the first channel recording of the electrocardiogram signal of FIG. 27. FIG. 30 illustrates a plurality of two dimensional histograms having $32^2$ bins (grid elements) with tap delay of 0.05 s for the first channel recording of the electrocardiogram signal of FIG. 27.

FIG. 31 illustrates the efficacy of the present invention for predicting cessation of atrial fibrillation from the histograms of FIG. 30. The upper two plots illustrate training of the machine learning algorithm, with trace 3110 showing the actual value of each case (with a value of −1 representing a Class A sample and a value of 1 representing a Class B sample). Trace 3120 shows the predicted values produced by the trained machine learning algorithm for each sample. Trace 3140 shows an AROC of 0.5 (equivalent to randomly guessing for each sample), while trace 3130 illustrates the performance of the machine learning algorithm in predicting the sample Class, with an AROC (area under receiver operating characteristic) of 0.62. The lower two plots of FIG. 31 illustrate the results when the trained algorithm was applied to a test set of samples, with an AROC of around 0.76 illustrating that the prediction of the machine learning algorithm is substantially more accurate than random guessing.

FIG. 32 illustrates a plurality of two dimensional histograms having $32^2$ bins (grid elements) with tap delay of 0.05 s for the second channel recording of the electrocardiogram signal of FIG. 27. FIG. 33 illustrates the efficacy of the present invention for predicting cessation of fibrillation from the histograms of both FIG. 30 and FIG. 32. As can be seen in FIG. 33, when both channels are taken into account the AROC of the machine learning algorithm improves to 0.89 for the training set, but reduces to 0.63 for the test set.

While prediction results are not provided here it has been noted that the present invention is effective in the low resolution cases such as those having $2^2$ bins of the type shown in FIG. 28. Similarly, while the greyscale representation of density in FIGS. 28-30 represents the sample count in each bin, the present invention may also be applied in applications having a density resolution which is small, such that the greyscale seen in FIGS. 28 to 30, for example, might instead only have coarse density resolution between 4 or 8 density levels, for example.

The examples of FIGS. 27 to 32 thus illustrate that the present invention offers a particularly simple and effective means by which predictions may be made of at least one characteristic of ECG signals. The present invention exhibits such efficacy while avoiding the need for complex pre-processing of the signal, for example the present embodiments do not require Fourier transforms of signals, and do not require feature selection of signals, such as extraction or removal of the QRS complex in ECG data (the QRS complex being ventricular and considered by some to interfere with atrial assessment). Accordingly, the present invention may be particularly well suited to implementation in simple hardware devices having a limited power budget, such as prosthetics or implants, for example a pacemaker.

While reference is made herein to a histogram being at least two dimensional, it is to be appreciated that such multi-dimensionality applies in respect of the data represented by the histogram, and that processing of the histogram may occur in a serial manner, for example by reading out values from the histogram by traversing the histogram.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A method of assessing a signal, the method comprising:
repetitively sampling the signal from at least two tap points to retrieve a single successive sample set at each sampling, the at least two tap points being separated by a fixed time delay, the sampling being asynchronous relative to the signal, each sample set having a single distinct value of the sampled signal from each and every tap point;

retrieving a plurality of such sample sets over time that define a probability density;

building an at least two dimensional histogram of the probability density of the plurality of sample sets; and passing the at least two dimensional histogram to a machine learning algorithm trained to predict a value of at least one characteristic of the signal.

2. The method of claim 1 wherein the machine learning algorithm comprises a supervised learning technique.

3. The method of claim 2 wherein the machine learning algorithm comprises regression.

4. The method of claim 2 wherein the machine learning algorithm comprises ridge regression.

5. The method of claim 2 wherein the machine learning algorithm comprises support vector regression.

6. The method of claim 1 wherein the machine learning algorithm utilizes a linear kernel.

7. The method of claim 1 wherein the machine learning algorithm utilizes a non-linear kernel.

8. The method of claim 7 wherein the machine learning algorithm utilizes a non-linear kernel comprising a polynomial of degree n.

9. The method of claim 1 wherein the machine learning algorithm is trained on training sets created from simulations.

10. The method of claim 1 wherein the machine learning algorithm is trained on training sets created from experimental measurements.

11. The method of claim 1 wherein the two dimensional histogram is built by determining a number of sample points occurring in each of a plurality of sub-areas or sub-volumes of the joint probability density function.

12. A device for assessing a signal, the device comprising:

a multi-tap sampler for repetitively sampling the signal from at least two tap points to retrieve a single successive sample set at each sampling, the at least two tap points being separated by a fixed time delay, the sampling being asynchronous relative to the signal, each sample set having a single distinct value of the sampled signal from each and every tap point, and for retrieving a plurality of sample sets over time that define a probability density;

a processor for building an at least two dimensional histogram of the probability density of the plurality of sample sets; and a machine learning module trained to predict a value of at least one characteristic of the signal from processing the at least two dimensional histogram.

* * * * *